(12) United States Patent
Otake

(10) Patent No.: US 10,336,344 B2
(45) Date of Patent: Jul. 2, 2019

(54) VEHICLE CONTROL APPARATUS

(71) Applicant: TOYOTA JIDOSHA KABUSHIKI KAISHA, Toyota-shi (JP)

(72) Inventor: Hirotada Otake, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 107 days.

(21) Appl. No.: 15/432,497

(22) Filed: Feb. 14, 2017

(65) Prior Publication Data

US 2017/0232973 A1 Aug. 17, 2017

(30) Foreign Application Priority Data

Feb. 16, 2016 (JP) .................................. 2016-026524

(51) Int. Cl.
| | |
|---|---|
| *B60W 30/12* | (2006.01) |
| *B60W 30/16* | (2012.01) |
| *B60W 40/08* | (2012.01) |
| *B60W 50/08* | (2012.01) |
| *B60W 50/10* | (2012.01) |
| *B60W 50/14* | (2012.01) |

(52) U.S. Cl.
CPC .......... *B60W 50/082* (2013.01); *B60W 30/12* (2013.01); *B60W 40/08* (2013.01);
(Continued)

(58) Field of Classification Search
CPC .... B60W 50/082; B60W 50/10; B60W 40/08; B60W 30/12; B60W 50/14; B60W 2540/18; B60W 2540/106; B60W 2540/103; B60W 30/16; B60W 2040/0818; B60W 2420/52; B60W 2420/42;
(Continued)

(56) References Cited

U.S. PATENT DOCUMENTS

| | | | |
|---|---|---|---|
| 8,433,470 B1* | 4/2013 | Szybalski | ............... B62D 1/286 701/23 |
| 2003/0055538 A1* | 3/2003 | Yanaka | ................... B60L 15/10 701/1 |

(Continued)

FOREIGN PATENT DOCUMENTS

| | | |
|---|---|---|
| JP | 6-156112 A | 6/1994 |
| JP | 2001-301639 | 10/2001 |

(Continued)

*Primary Examiner* — Russell Frejd
(74) *Attorney, Agent, or Firm* — Oblon, McClelland, Maier & Neustadt, L.L.P.

(57) ABSTRACT

Driving support ECU determines that a driver is in an abnormal state when a state where a steering amount correlation value which changes when a steering wheel SW of a vehicle is operated does not change continues over more than or equal to an abnormality determination threshold time. When the driver is determined to be in the abnormal state, the ECU decelerates the vehicle, makes a hazard lamp blink and invalidates an acceleration request based on a change in an operation amount of an accelerator pedal. The ECU terminates decelerating of the vehicle and permits the acceleration override when a specific driving operation (an operation that the accelerator pedal changes from an operating state to a non-operating state and then again changes to the operating state within a predetermined threshold time) is determined to have occurred after the driver has been determined to be in the abnormal state.

16 Claims, 21 Drawing Sheets

(52) U.S. Cl.
CPC ............ *B60W 50/10* (2013.01); *B60W 50/14* (2013.01); *B60W 30/16* (2013.01); *B60W 2040/0818* (2013.01); *B60W 2420/42* (2013.01); *B60W 2420/52* (2013.01); *B60W 2540/10* (2013.01); *B60W 2540/103* (2013.01); *B60W 2540/106* (2013.01); *B60W 2540/12* (2013.01); *B60W 2540/18* (2013.01); *B60W 2540/26* (2013.01); *B60W 2710/20* (2013.01)

(58) Field of Classification Search
CPC ......... B60W 2710/20; B60W 2540/12; B60W 2540/26; B60W 2540/10
See application file for complete search history.

(56) References Cited

U.S. PATENT DOCUMENTS

| | | | |
|---|---|---|---|
| 2013/0018549 A1 | 1/2013 | Kobana et al. | |
| 2015/0120124 A1* | 4/2015 | Bartels | B60W 50/10 701/23 |
| 2015/0253772 A1* | 9/2015 | Solyom | G05D 1/0212 701/25 |

FOREIGN PATENT DOCUMENTS

| | | |
|---|---|---|
| JP | 2004-182061 | 7/2004 |
| JP | 2006-315491 | 11/2006 |
| JP | 2008-126685 | 6/2008 |
| JP | 2008-195402 | 8/2008 |
| JP | 4172434 | 10/2008 |
| JP | 2009-73462 | 4/2009 |
| JP | 2009-190464 | 8/2009 |
| JP | 4349210 | 10/2009 |
| JP | 2010-6279 | 1/2010 |
| JP | 2010-125921 A | 6/2010 |
| JP | 4929777 | 5/2012 |
| JP | 2013-152700 | 8/2013 |
| JP | 2014-44707 A | 3/2014 |
| JP | 2014-91380 A | 5/2014 |
| JP | 2014-148293 | 8/2014 |
| KR | 10 2005 0017187 A | 2/2005 |
| WO | WO 2012/086502 A1 | 6/2012 |
| WO | WO 2013/008299 A1 | 1/2013 |

* cited by examiner

VEHICLE CONTROL APPARATUS

TECHNICAL FIELD

The present invention relates to a vehicle control apparatus coping with a case where a driver has fallen into an abnormal state in which the driver loses an ability to drive a vehicle.

BACKGROUND ART

An apparatus has conventionally been proposed which determines whether or not a driver has fallen into an abnormal state where the driver loses an ability to drive a vehicle (for example, a drowsy driving state, a mental and physical failure state, or the like), and performs driving support when the driver is determined to be in such an abnormal state.

For example, one of conventional apparatuses is configured to calculate a deviation ε of a future position from a target course position of a vehicle based on a shape of a traveling road and a position of the vehicle in a traveling lane, to detect a steering angle σ corresponding to a steering operation of the driver, to determine that the driver is in the abnormal state when a region represented by a combination of the deviation ε and the steering angle σ indicates "abnormality", and to perform driving support such as braking control and the like (for example, refer to Japanese Patent Application Laid-Open (kokai) No. 2009-73462 (see. the abstract, the paragraph [0099], and the like.)

SUMMARY OF THE INVENTION

However, according to the conventional apparatus, once the driver is determined to have fallen into the abnormal state, driving support in response to the abnormal state is continuously performed. Therefore, a problem arises that there is a possibility that it becomes impossible to cancel the driving support if the driver has not actually fallen into the abnormal state, resulting in obstructing a driving operation by the driver.

The present invention is made in order to resolve the problem above. That is, one of objects of the present invention is to provide a vehicle control apparatus which permits the driving operation by the driver when a state is detected which allows a determination that the driver has fallen into the abnormal state to be reversed even after the determination has been made.

The vehicle control apparatus (hereinafter, may be referred to as a "present invention apparatus") of the present invention is applied to a vehicle. The vehicle control apparatus of the present invention comprises;

abnormality determination means (10, step 560, 760, 860, 960, and 980, or a routine in FIG. 14) for determining whether or not a driver of the vehicle is in an abnormal state where the driver loses an ability to drive the vehicle; and driving operation invalidation means (10, steps 650 and 660, steps 1492, 1810, 1910, and 1920) for invalidating a driving state change request which is based on an operation of a driving operation element operated by the driver for a purpose of changing a driving state of the vehicle after an abnormality determination point in time at which the driver has been determined to be in the abnormal state.

According to the present invention apparatus, the determination of whether or not the driver is in the abnormal state where he/she loses an ability to drive the vehicle is performed by means of the abnormality determination means.

Various methods can be adopted for the determination of the abnormal state. For example, as described later, a method to determine that the driver is in the abnormal state in a case when a state where a steering amount correlation value (a steering torque, a steering angle, or the like) which changes when a steering wheel of the vehicle is operated does not change continues over more than or equal to an abnormality determination threshold time can be adopted. Alternatively, a method to determine that the driver is in the abnormal state in a case when a state where a confirmation button to cancel a warning is not operated continuously/successively occurs when the warning is periodically repeated can be adopted.

Moreover, according to the present invention apparatus, after the abnormality determination point in time (the time at which the determination that the driver is abnormal has been confirmed/finalized), the driving state change request is invalidated, the driving state change request being a request based on an operation of the driving operation element (for example, an accelerator pedal, a steering wheel, or the like, as described later) operated by the driver for a purpose of changing the driving state of the vehicle. That is, for example, in a case where the driving operation element is the accelerator pedal, an acceleration request owing to the depression of the accelerator pedal is invalidated (ignored), and as a result, the vehicle is not accelerated. Likewise, for example, in a case where the driving operation element is the steering wheel, a turning request owing to the operation of the steering wheel is invalidated (ignored), and as a result, the steered wheels are not turned/steered.

However, in a case when the aforementioned abnormality determination turned out to be incorrect, it is preferred that the driving state of the vehicle be changed based on the driving state change request.

Accordingly, the present invention apparatus comprises; specific operation determination means (10, step 1020, step 1210, step 1240, step 1620, step 2010) for determining whether or not a specific driving operation has occurred after the abnormality determination point in time, the specific driving operation being an operation that a state of the driving operation element changes from an operating state in which the driving operation element is regarded as being operated to a non-operating state in which the driving operation element is regarded as not being operated, and thereafter again changes to the operating state within a predetermined threshold time, wherein, the driving operation invalidation means is configured to cancel invalidating the driving state change request when the specific driving operation is determined to have occurred (that is, when the specific driving operation has been detected) (step 1050, step 1130, step 1640, step 2020).

The aforementioned specific driving operation is considered/regarded as an operation that is performed under a situation where it is surely determined that the driver is not in the abnormal state. Therefore, according to the present invention apparatus, in a case when the aforementioned specific driving operation is determined to have occurred (that is, a case when it is surely determined that the driver is not in the abnormal state), the invalidation of the driving state change request by means of the aforementioned driving operation invalidation means is canceled. Hence, it becomes possible for the driver to change the driving state of the vehicle by operating the driving operation element (that is, it becomes possible for the driver to drive the vehicle using the driving operation element).

One aspect of the present invention apparatus further comprises warning means for generating a warning to the driver at latest from the abnormality determination point in time (10, 70-72, step 650 and step 660, step 1530 and step 1540, step 1910 and step 1920).

In this case, the warning means is configured to stop the warning when the specific driving operation is determined to have occurred (refer to step 1050, step 1130, a determination of "No" in step 655, a determination of "No" in step 1510, step 1620 and step 1630).

With this configuration, the warning is canceled in a case when the driver is determined not to be in the abnormal state by being determined that the aforementioned specific driving operation has occurred. It can be avoided that unnecessary warnings continue to be generated/raised to the driver who is not in the abnormal state.

In another aspect of the present invention apparatus, the driving operation invalidation means and the specific operation determination means adopt, as the driving operation element, an accelerator pedal (11*a*) used for changing an acceleration state as a driving state of the vehicle, the vehicle control apparatus further comprises deceleration means (10, 20, 21, 30, 31, step 650, step 1530, step 1910) for forcibly decelerating, at latest from the abnormality determination point in time, the vehicle so that the vehicle stops driving, and the deceleration means is configured to stop the forcible deceleration when the specific driving operation is determined to have occurred (refer to step 1050, a determination of "No" in step 655, a determination of "No" in step 1510, step 1620 and step 1630).

With this configuration, by means of the driving operation invalidation means, the vehicle is not accelerated even if/when the accelerator pedal as the driving operation element is operated so as to be depressed after the abnormality determination point in time. That is, an acceleration override (AOR) is prohibited. Further, by means of the deceleration means, at latest after the abnormality determination point in time, the vehicle is forced to decelerate so that the vehicle stops driving. Consequently, it becomes possible to stop the vehicle safely. On the other hand, under a situation where the acceleration override is prohibited, it is highly likely that the driver who is not in the abnormal state tries to operate the accelerator pedal intentionally so as to change the acceleration state (an acceleration rate). Therefore, in a case when the accelerator pedal changes from the operating state to the non-operating state and then again changes to the operating state within the aforementioned threshold time under the situation where the acceleration override is prohibited (that is, a case when the specific driving operation has occurred), it is highly likely that the operation is performed by the driver who is not in the abnormal state. According to the aforementioned aspect, in a case when the driver can be surely determined not to be in the abnormal state as described above, the acceleration override is permitted and the forcible deceleration is stopped. Thus, the driver who is not in the abnormal state can accelerate the vehicle based on the acceleration request (the driving state change request) made by an operation of the accelerator pedal.

In another aspect of the present invention apparatus, the specific operation determination means is configured to;

determine that the accelerator pedal is in the non-operating state when an accelerator pedal operational state, defined by an operation amount (AP) of the accelerator pedal as the driving operation element and a change amount per unit time (dAP/dt) of the operation amount of the accelerator pedal, is inside a region located on a side of an origin with respect to a first boundary line (line L1 in FIG. 12) (that is, an off region), wherein the origin is a point at which both the operation amount and the change amount are zero, and the first boundary line is a line which defines a relationship between the change amount and the operation amount in such a manner that the change amount becomes smaller as the operation amount becomes larger; and determine that the accelerator pedal is in the operating state when the accelerator pedal operational state is inside an on region located on a side opposite to the origin with respect to a second boundary line (line L2 in FIG. 12) which defines a relationship between the change amount and the operation amount in such a manner that the change amount becomes smaller as the operation amount becomes larger (step 1220 and a block B1 in FIG. 12).

In this case, the first boundary line and the second boundary line are set so that a change amount of the accelerator pedal on the second boundary line of when the operation amount of the accelerator pedal has an arbitrary value is more/greater than or equal to a change amount of the accelerator pedal on the first boundary line of when the operation amount of the accelerator pedal has that arbitrary value.

Provided that the driver has not fallen into the abnormal state, in a case when he/she tries to accelerate the vehicle under the situation where the acceleration override is prohibited, it is considered to be highly likely that he/she operates the accelerator pedal with a large and quick motion, and then release the accelerator pedal with a quick motion, and after that, operates the accelerator pedal with a large and quick motion. In other words, it is unlikely that the driver operates the accelerator pedal in a manner mentioned above if he/she is in the abnormal state. Therefore, according to the above configuration, it can be more surely determined that the driver is not in the abnormal state.

In another aspect of the present invention apparatus, the specific operation determination means is configured to;

determine that the accelerator pedal is in the non-operating state when the operation amount (AP) of the accelerator pedal as the driving operation element is less than a first threshold (AP1th) operation amount; and determine that the accelerator pedal is in the operating state when the operation amount (AP) of the accelerator pedal is more than or equal to a second operation amount (AP2th) which is more than or equal to the first threshold operation amount (step 1220 in FIG. 12 and FIG. 13).

Provided that the driver has not fallen into the abnormal state, in a case when he/she tries to accelerate the vehicle under the situation where the acceleration override is prohibited, it is considered to be highly likely that he/she depress the accelerator pedal largely, and then release the accelerator pedal, and after that, again depress the accelerator pedal largely. In other words, it is unlikely that the driver operates the accelerator pedal in a manner mentioned above if he/she is in the abnormal state. Therefore, according to the above configuration, it can be surely determined that the driver is not in the abnormal state.

In another aspect of the present invention apparatus, the abnormality determination means is configured to determine that the driver is in the abnormal state when a state where a steering amount correlation value (Tra, θ) which changes when a steering wheel (SW) of the vehicle is operated does not change continues over more than or equal to an abnormality determination threshold time (T1th+ T2th+T3th+T4th) (refer to steps 560, 760, 860, 960 and 980).

As the steering amount correlation value, the steering torque (Tra), the steering angle (θ), and the like, are named, for example. The state where the steering amount correlation value does not change includes a case where the steering amount correlation value does not change over a threshold range within a predetermined time (that is, a case where the steering amount correlation value cannot be considered to substantially change). Provided that the driver has not fallen into the abnormal state, a situation rarely occurs where the steering amount correlation value does not change over more than or equal to the abnormality determination threshold time. Therefore, according to the above configuration, it can be surely determined that the driver is in the abnormal state.

In this case, another aspect of the present invention apparatus comprises;

trailing inter-vehicle distance control means (10, 16, 17, 18, 20-22, 30-32, steps 610, 620) for performing a trailing inter-vehicle distance control for a purpose of making the vehicle trail travel, keeping a predetermined inter-vehicle distance from an other vehicle traveling immediately ahead the vehicle; and traffic lane keeping control means (10, 17-19, 50-70, steps 610, 620, 630 and 640) for performing a traffic lane keeping control to recognize a traveling lane where the vehicle is traveling and to control a steering angle of each of steered wheels of the vehicle in such a manner that the vehicle does not deviate from the traveling lane.

Besides, the abnormality determination means is configured to start a determination of whether or not the driver is in the abnormal state (by using the steering amount correlation value) in a case when both the trailing inter-vehicle distance control and the traffic lane keeping control are being performed (steps 530 to 550).

In a case when the trailing inter-vehicle distance control and the traffic lane keeping control are being performed, the vehicle is substantially driven automatically, and therefore driving of the vehicle continues even when the driver has fallen into the abnormal state. Thus, it is preferred to perform a determination of whether or not the driver has fallen into the abnormal state, and to decelerate or stop the vehicle when the driver is determined to be in the abnormal state. Further, in a case when the traffic lane keeping control is being performed, the steering wheel is automatically steered when there is a possibility for the vehicle to deviate from the traveling lane. Therefore, if the driver is not in the abnormal state, it is highly likely that he/she notices an automatic steering, and operates the steering wheel to try to have the vehicle go back to an appropriate position. In other words, if the traffic lane keeping control is being performed when the driver is not in the abnormal state, a situation highly rarely occurs where the steering amount correlation value does not change over more than or equal to the abnormality determination threshold time. Thus, according to the above configuration, a determination that the driver is in the abnormal state can be further surely performed.

In another aspect of the present invention apparatus, the driving operation invalidation means and the specific operation determination means adopt, as the driving operation element, a steering wheel (SW) used for changing a steering state as the driving state of the vehicle (step 1910, step 1920, step 2010, step 2020).

With this configuration, after the abnormality determination point in time, the steered wheels are not turned/steered even if/when the steering wheel is operated. That is, steering override (SOR) is prohibited. Therefore, it becomes possible to make the vehicle travel safely by automatically steering/turning the steered wheels, or the like. On the other hand, under a situation where the steering override is prohibited, it is highly likely that the driver who is not in the abnormal state tries to operate the steering wheel intentionally so as to change a traveling direction (a turning state) of the vehicle. Therefore, in a case when the steering wheel changes from the operating state to the non-operating state and then again changes to the operating state within the aforementioned threshold time under the situation where the steering override is prohibited (that is, a case when the specific driving operation has occurred), it is highly likely that the operation is performed by the driver who is not in the abnormal state. Therefore, according to the aforementioned aspect, it becomes possible to change the traveling direction of the vehicle based on the turning request (the driving state change request) made by an operation of the steering wheel of when it is surely determined that the driver is not in the abnormal state.

In the above description, references used in the following descriptions regarding embodiments are added with parentheses to the elements of the present invention, in order to assist in understanding the present invention. However, those references should not be used to limit the scope of the invention. Other objects, other features, and accompanying advantages of the present invention will be readily understood from the description of embodiments of the present invention to be given referring to the following drawings.

DESCRIPTION OF THE EMBODIMENT

A vehicle control apparatus (driving support apparatus) according to each of embodiments of the present invention will be described below, referring to figures.

First Embodiment

Figure 1:
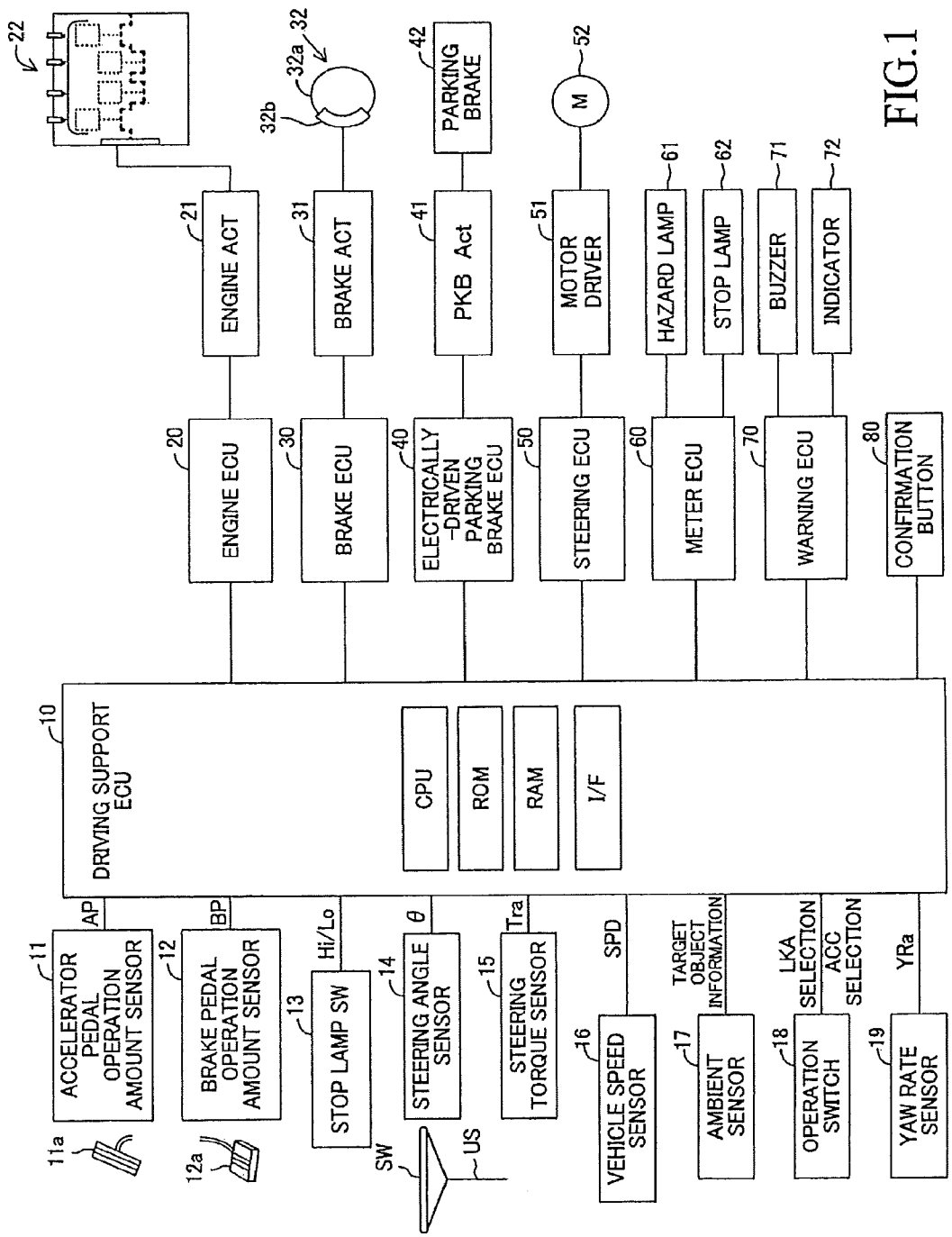
FIG. 1 is a schematic configuration diagram of a vehicle control apparatus (a first apparatus) according to a first embodiment of the present invention.

A vehicle control apparatus according to the first embodiment of the present invention (hereinafter, may be referred to as a "first apparatus") is, as shown in FIG. 1, applied to a vehicle (hereinafter, may be referred to as an "own vehicle" in order to distinguish it from other vehicles), and comprises a driving support ECU 10, an engine ECU 20, a brake ECU 30, an electrically-driven parking brake ECU 40, a steering ECU 50, a meter ECU 60, and a warning ECU 70. Each of the ECUs is an electric control unit comprising a microcomputer as a main part. Those ECUs are connected via CAN (Controller Area Network) which is not illustrated so that the ECUs are capable of mutually transmitting and receiving information. In the present specification, the microcomputer includes CPU, ROM, RAM, a non-volatile memory, an interface I/F, or the like. The CPU is configured to realize/perform various functions by executing instructions (i.e., programs or routines) stored in the ROM.

The driving support ECU 10 is connected to sensors (including switches) listed below, and is configured to receive a detection signal or an output signal of these sensors. It should be noted that each sensor may be connected to ECUs other than the driving support ECU 10. In this case, the driving support ECU 10 receives the detection signal or the output signal of the sensor via CAN from the ECU to which the sensor is connected.

An accelerator pedal operation amount sensor 11 is configured to detect an operation amount (an accelerator position) of an accelerator pedal 11a of the own vehicle, and to output a signal representing the accelerator pedal operation amount AP.

A brake pedal operation amount sensor 12 is configured to detect an operation amount of a brake pedal 12a of the own vehicle, and to output a signal representing the brake pedal operation amount BP.

A stop lamp switch 13 is configured to output a low level signal when the brake pedal 12a is not being depressed (is not being operated), and to output a high level signal when the brake pedal 12a is being depressed (is being operated).

A steering angle sensor 14 is configured to detect a steering angle of the own vehicle, and to output a signal representing the steering angle θ.

A steering torque sensor 15 is configured to detect a steering torque added to a steering shaft US of the own vehicle by an operation of a steering wheel SW, and to output a signal representing the steering torque Tra.

A vehicle speed sensor 16 is configured to detect a traveling speed (a vehicle speed) of the own vehicle, and to output a signal representing the vehicle speed SPD.

An ambient sensor 17 is configured to obtain information regarding at least a road ahead of the own vehicle, and a three-dimensional object present in the road. The three-dimensional object includes, for example, moving objects such as a pedestrian, a bicycle and an automobile, and static objects such as a power pole, a tree, and a guardrail. Hereinafter, these three-dimensional objects may be referred to as a "target object."

The ambient sensor 17 comprises, for example, a radar sensor and a camera sensor.

The radar sensor emits, for example, an electric wave in a millimeter waveband (hereinafter, referred to as a "millimeter wave") to an ambient region of the own vehicle including at least a front region of the own vehicle, and receives a millimeter wave (i.e., a reflected wave) reflected from a target object which is present in the emitted area. Moreover, the ambient sensor 17 is configured to calculate and output information as to whether or not a target object is present and a relative relationship between the own vehicle and the target object (that is, a distance between the own vehicle and the target object, a relative speed of the target object relative to the own vehicle, or the like).

More concretely, the radar sensor comprises a processor. The processor obtains, every predetermined period of time, an inter-vehicle distance (a longitudinal distance) Dfx(n), a relative speed Vfx(n), a lateral distance Dfy(n), a relative lateral speed Vfy(n), and the like, with respect to each detected target object (n) based on a phase difference between the transmitted millimeter wave and the received reflected wave, an attenuation level of the reflected wave, a time from a point in time of transmitting the millimeter wave to a point in time of receiving the reflected wave, or the like.

The inter-vehicle distance Dfx(n) is a distance between the own vehicle and the target object (n) (for example, a preceding vehicle) along a central axis of the own vehicle.

The relative speed Vfx(n) is a difference between a speed Vs of the target object (n) (for example, the preceding vehicle) and a speed Vj of the own vehicle (=Vs−Vj). The speed Vs is a speed of the target object (n) in a traveling direction of the own vehicle.

The lateral distance Dfy(n) is a distance between a "central position of the target object (n) (for example, a central position of the preceding vehicle in its width direction)" and the central axis of the own vehicle in a direction perpendicular to the same central axis. The lateral distance Dfy(n) is also referred to as a "lateral position".

The relative lateral speed Vfy(n) is a speed of the central position of the target object (n) (for example, the central position of the preceding vehicle in its width direction) in the direction perpendicular to the central axis of the own vehicle.

The camera sensor comprises a stereo camera and a processor, and photographs/captures landscapes of a left-side region and a right-side region in front of the vehicle to obtain a left-and-right pair of image data. The camera sensor is configured to calculate information as to whether or not a target object is present, a relative relationship between the own vehicle and the target object and the like, based on the photographed/captured left-and-right pair of image data to output them. In this case, the driving support ECU 10 determines a relative relationship between the own vehicle and the target object by composing the relative relationship between the own vehicle and the target object obtained by the radar sensor and the relative relationship between the own vehicle and the target object obtained by the camera sensor. Further, the camera sensor is configured to recognize a lane marker such as a left white line and a right white line of a road (hereinafter, simply referred to as a "white line") based on the photographed/captured left-and-right pair of image data and to calculate a shape of the road and a positional relationship between the road and the vehicle to output them.

The information obtained by the ambient sensor 17 is referred to as a target object information. The ambient sensor 17 repeatedly transmits the target object information to the driving support ECU 10 every time a predetermined period elapses. It should be noted that the ambient sensor 17 does not necessarily comprise both of the radar sensor and the camera sensor. For example, the ambient sensor 17 may comprise only the camera sensor. Moreover, the information regarding the shape of the road on which the vehicle travels and regarding the positional relationship between the road and the own vehicle may be obtained by making use of information from a non-illustrated navigation system.

An operation switch 18 is a switch to be operated by a driver. The driver can select whether or not to perform a traffic lane keeping control (LKA: Lane Keeping Assist control) by operating the operation switch 18. Moreover, the driver can select whether or not to perform a trailing inter-vehicle distance control (ACC: Adaptive Cruise Control) by operating the operation switch 18.

A yaw rate sensor 19 is configured to detect a yaw rate of the own vehicle to output an actual yaw rate YRa.

The driving support ECU 10 is configured to perform the LKA and the ACC. Further, as described later, the driving support ECU 10 is configured to determine whether or not the driver is in an abnormal state in which the driver loses an ability to drive the vehicle, and to perform various types of control to perform appropriate processes when the driver is determined to be in the abnormal state.

The engine ECU 20 is connected to an engine actuator 21. The engine actuator 21 includes actuators for changing a driving state of an internal combustion engine 22. In the present embodiment, the internal combustion engine 22 is a gasoline fuel injection, spark ignition, multi-cylinder engine, and comprises a throttle valve to adjust an intake air amount. The engine actuator 21 includes at least a throttle valve actuator to change an opening degree of the throttle valve. The engine ECU 20 can change torque which the internal combustion engine 22 generates by driving the engine actuator 21. The torque which the internal combustion engine 22 generates is transmitted to a non-illustrated driving wheels via a non-illustrated transmission gear. Therefore, the engine ECU 20 can control the engine actuator 21 to control a driving force of the own vehicle, so as to change an acceleration state (an acceleration rate).

The brake ECU 30 is connected to a brake actuator 31. The brake actuator 31 is provided in a hydraulic circuit between a non-illustrated master cylinder to compress operating fluid with a depression force of the brake pedal and friction brake mechanisms 32 provided at left-and-right-front wheels and left-and-right-rear wheels. Each of the friction brake mechanisms 32 comprises a brake disc 32a fixed to the wheel and a brake caliper 32b fixed to a vehicle body. The brake actuator 31 adjusts, in response to an instruction from the brake ECT 30, an hydraulic pressure that is supplied to a wheel cylinder which is built in the brake caliper 32, and operates the wheel cylinder with the hydraulic pressure. Thereby, the brake actuator 31 presses a brake pad onto the brake disc 32a to generate a friction braking force. Accordingly, the brake ECU 30 can control the braking force of the own vehicle by controlling the brake actuator 31.

The electrically-driven parking brake ECU (hereinafter, may be referred to as an "EPB ECU") 40 is connected to a parking brake actuator (hereinafter, may be referred to as a "PKB actuator") 41. The PKB actuator 41 is an actuator for pressing the brake pad onto the brake disc 32a or for, in a case when comprising a drum brake, pressing a shoe onto a drum rotating with the wheel. Therefore, EPB ECU 40 can add a parking brake force to the wheel by means of the PKB actuator 41 to maintain the vehicle in a stop state.

The steering ECU 50 is a control apparatus of a well-known electrically-driven power steering system and is connected to a motor driver 51. The motor driver 51 is connected to a steering motor 52. The steering motor 52 is incorporated into a non-illustrated "steering mechanism including the steering wheel, the steering shaft coupled to the steering wheel, a gear mechanism for steering, and the like" of the vehicle. The steering motor 52 generates torque with electric power supplied from the motor driver 51 to be able to add a steering assist torque using the torque, or to turn left-and-right steered wheels.

The meter ECU 60 is connected to a non-illustrated digital indication type meter and is also connected to a hazard lamp 61 and a stop lamp 62. The meter ECU 60 can, in response to an instruction from the driving support ECU 10, make the hazard lamp 61 blink and make the stop lamp 62 light.

The warning ECU 70 is connected to a buzzer 71 and an indicator 72. The warning ECU 70 can, in response to an instruction from the driving support ECU 10, make the buzzer 71 sound to alert the driver, make a mark for alerting (for example, a warning lamp) light on the indicator 72, and display an operating state of a driving support control on the indicator 72.

Moreover, the driving support ECU 10 is connected to a confirmation button 80. The confirmation button 80 is arranged at a position capable of being operated by the driver. The confirmation button 80 is configured to output a low-level signal when not being operated and to output a high-level signal when being pressed.

(Operation)

Next, main operation of the driving support ECU 10 will be described. The driving support ECU 10 proceeds to a mode for confirming that the driver is in the abnormal state in which he/she loses the ability to drive the vehicle when "driving without holding the steering wheel" continues for a predetermined time (T1th+T2th) while both of the traffic lane keeping control (LKA) and the trailing inter-vehicle distance control (ACC) are being performed. Therefore, the traffic lane keeping control and the trailing inter-vehicle distance control will be described first.

<Traffic Lane Keeping Control (LKA)>

The traffic lane keeping control is a control to support a steering operation of the driver by adding the steering torque to the steering mechanism so that a position of the own vehicle is kept nearby (in the vicinity of) a target traveling line in a "lane on which the own vehicle is traveling (a traveling lane)". The traffic lane keeping control itself is well known (for example, refer to Japanese Patent Applications Laid-Open (kokai) No. 2008-195402, No. 2009-190464, No. 2010-6279, and Japanese Patent No. 4349210, and so on.). Therefore, a simple description will next be made below.

Figure 2:
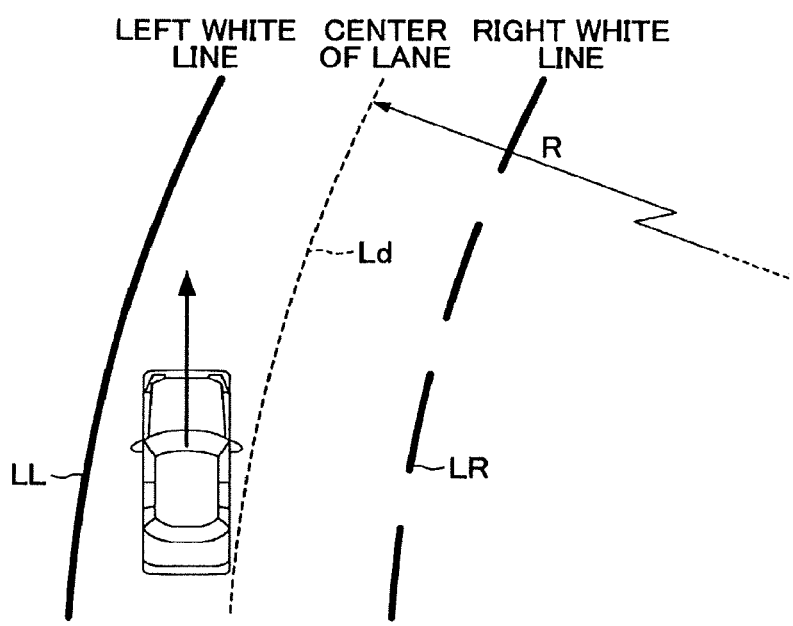
FIG. 2 is a plan view showing a left white line, a right white line, a target traveling line, and a curve radius.

The driving support ECU 10 performs the traffic lane keeping control when the traffic lane keeping control is being requested by the operation of the operation switch 18. More specifically, as shown in FIG. 2, the driving support ECU 10 recognizes (obtains) "the left white line LL and the right white line LR" of the lane on which the own vehicle is traveling based on the information transmitted from the ambient sensor 17 when the traffic lane keeping control is being requested, and determines a central position of a pair of these white lines to be a target traveling line Ld. In addition, the driving support ECU 10 calculates a curve radius R of the target traveling line Ld, and a position and a direction of the own vehicle in a traveling line defined by the left white line LL and the right white line LR.

Figure 3:
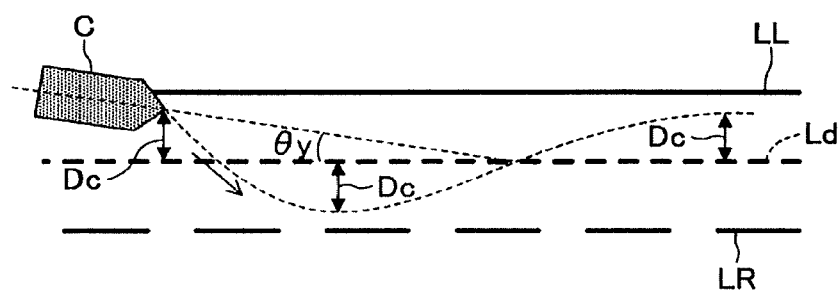
FIG. 3 is a diagram for describing a traffic lane keeping control.

The driving support ECU 10 calculates, as shown in FIG. 3, a distance Dc (hereinafter, referred to as a "center distance Dc") in a width direction of a road between a central position of a front end of the own vehicle and the target traveling line Ld, and a deviation angle θy (hereinafter, referred to as a "yaw angle θy") between a direction of the target traveling line Ld and the traveling direction of the own vehicle C.

The driving support ECU 10 calculates a target yaw rate YRc* using the following formula (1) based on the center distance Dc, the yaw angle θy, and a road curvature ν (=1/R) every time a predetermined calculation interval elapses. In the formula (1), K1, K2 and K3 are control gains. The target yaw rate YRc* is a yaw rate set so that the own vehicle can travel along the target traveling line Ld.

$$YRc^* = K1 \times Dc + K2 \times \theta y + K3 \times \nu \tag{1}$$

The driving support ECU 10 calculates a target steering torque Tr* for obtaining the target yaw rate YRc* based on the target yaw rate YRc* and the actual yaw rate YRa every time a predetermined calculation interval elapses. More specifically, the driving support ECU 10 stores a lookup table in advance which defines a relationship between a "deviation between the target yaw rate YRc* and the actual yaw rate YRa" and the "target steering torque Tr*", and calculates the target steering torque Tr* by applying the deviation between the target yaw rate YRc* and the actual yaw rate YRa to the table. Thereafter, the driving support ECU 10 controls the steering motor 52 using the steering ECU 50 so that the actual steering torque Tra matches with (becomes equal to/coincides with) the target steering torque Tr*. The above description is a summary of the traffic lane keeping control.

<Trailing Inter-vehicle distance Control (ACC)>

The trailing inter-vehicle distance control is a control to make the own vehicle trail the preceding vehicle traveling right ahead the own vehicle, while keeping the inter-vehicle distance between the preceding vehicle and the own vehicle to be/at a predetermined distance. The trailing inter-vehicle distance control itself is well known (for example, refer to Japanese Patent Applications Laid-Open (kokai) No. 2014-148293 and No. 2006-315491, and Japanese Patents No. 4172434, and No. 4929777 and so on.) Therefore, a simple description will be made below.

The driving support ECU 10 performs the trailing inter-vehicle distance control in a case when the trailing inter-vehicle distance control is being requested by the operation of the operation switch 18.

More specifically, the driving support ECU 10 selects a trailing target vehicle (i.e., a trailing objective vehicle) based on the target object information obtained by the ambient sensor 17 in a case when the trailing inter-vehicle distance control is being requested. For example, the driving support ECU 10 determines whether or not a relative position of the target object (n) identified by the lateral distance Dfy(n) and the inter-vehicle distance Dfx(n) of the detected target object (n) exists (or, is present) in a trailing target vehicle area which is set in advance so as to have a lateral length that becomes smaller as the inter-vehicle distance becomes larger. Thereafter, when the relative position of the target object exists (or, is present) in the trailing target vehicle area for more than or equal to a predetermined time, the driving support ECU 10 selects the target object (n) as the trailing target vehicle.

Further, the driving support ECU 10 calculates a target acceleration Gtgt using either a formula (2) or a formula (3) below. In the formula (2) and the formula (3), a Vfx(a) is a relative speed of the trailing target vehicle (a), k1 and k2 are predetermined positive gains (coefficients), and ΔD1 is an inter-vehicle deviation obtained by subtracting a "target inter-vehicle distance Dtgt" from an "inter-vehicle distance Dfx(a) of the trailing target vehicle (a)" (=Dfx(a)−Dtgt). It should be noted that the target inter-vehicle distance Dtgt is calculated by multiplying a target inter-vehicle time Ttgt which is set by the driver by using the operation switch 18 by the vehicle speed SPD of the own vehicle (that is, Dtgt=Ttgt×SPD).

The driving support ECU 10 determines the target acceleration Gtgt by using (in accordance with) the following formula (2) in a case when the value (k1×ΔD1+k2×Vfx(a)) is positive or "0". Ka1 is a positive gain (coefficient) for an acceleration and is set to be a value less than or equal to be "1".

The driving support ECU 10 determines the target acceleration Gtgt by using (in accordance with) the following formula (3) in a case when the value (k1×ΔD1+k2×Vfx(a)) is negative. Kd1 is positive a gain (coefficient) for a deceleration and is set to be "1" in the present embodiment.

$$Gtgt(\text{for the acceleration}) = ka1 \times (k1 \times \Delta D1 + k2 \times Vfx(a)) \tag{2}$$

$$Gtgt(\text{for the deceleration}) = kd1 \times (k1 \times \Delta D1 + k2 \times Vfx(a)) \tag{3}$$

It should be noted that in a case when the target object does not exist (or not be present) in the trailing target vehicle area, the driving support ECU 10 determines the target acceleration Gtgt based on a "target speed which is set depending on the target inter-vehicle time Ttgt" and the vehicle speed SPD, in such a manner that the vehicle speed SPD matches with (becomes equal to) the target speed.

The driving support ECU 10 controls the engine actuator 21 through the engine ECU 20, and when needed, controls the brake actuator 31 through the brake ECU 30 in such a manner that the acceleration of the vehicle matches with the target acceleration Gtgt.

<Abnormality Determination of Driver and Control at Each Stage>

The driving support ECU 10, as will be described below, determines whether or not the driver is in the abnormal state in which the driver loses the ability to drive the vehicle, and performs vehicle controls corresponding to a plurality of driving modes until the determination is confirmed. It should be noted hereinafter that an "abnormal state in which a driver loses an ability to drive a vehicle" will also be simply expressed as an "abnormal state of the driver", and a "determination as to whether or not a driver is in an abnormal state in which a driver loses an ability to drive a vehicle" will also be simply referred to as an "abnormality determination of the driver".

<<Automatic Mode>>

The driving support ECU 10 performs the abnormality determination of the driver, triggered by a detection of "driving without holding the steering wheel" in a case when both of the traffic lane keeping control (a traffic lane keeping control under a normal state) and the trailing inter-vehicle distance control are being performed. In an example shown in FIG. 4, both of the traffic lane keeping control and the trailing inter-vehicle distance control are being normally performed before a time t1. This driving mode will be referred to as an "automatic mode".

Now, it is assumed that the driver has fallen into the abnormal state in which the driver loses the ability to drive the vehicle (hereinafter, also expressed to as "the driver has become an abnormal state".) at the time t1. Meanwhile, the driving support ECU 10 monitors the steering torque Tra detected by the steering torque sensor 15 when performing the traffic lane keeping control, and determines whether or not a state in which the steering torque Tra is zero ("0") has continued for a time (duration) longer than or equal to a first threshold time T1th, so as to determine whether or not a "state of driving without holding the steering wheel" has occurred. The first threshold time T1th is five seconds, for example.

<<First Mode>>

As mentioned above, in the example shown in FIG. 4, the driver has become the abnormal state at the time t1. In general, when the driver becomes the abnormal state, the driver is incapable of operating the steering wheel. Therefore, the driving support ECU 10 determines that the state of driving without holding the steering wheel has occurred to perform a "warning of not-holding the steering wheel" at a time t2 at which the first threshold time T1th has passed from the time t1.

Figure 4:
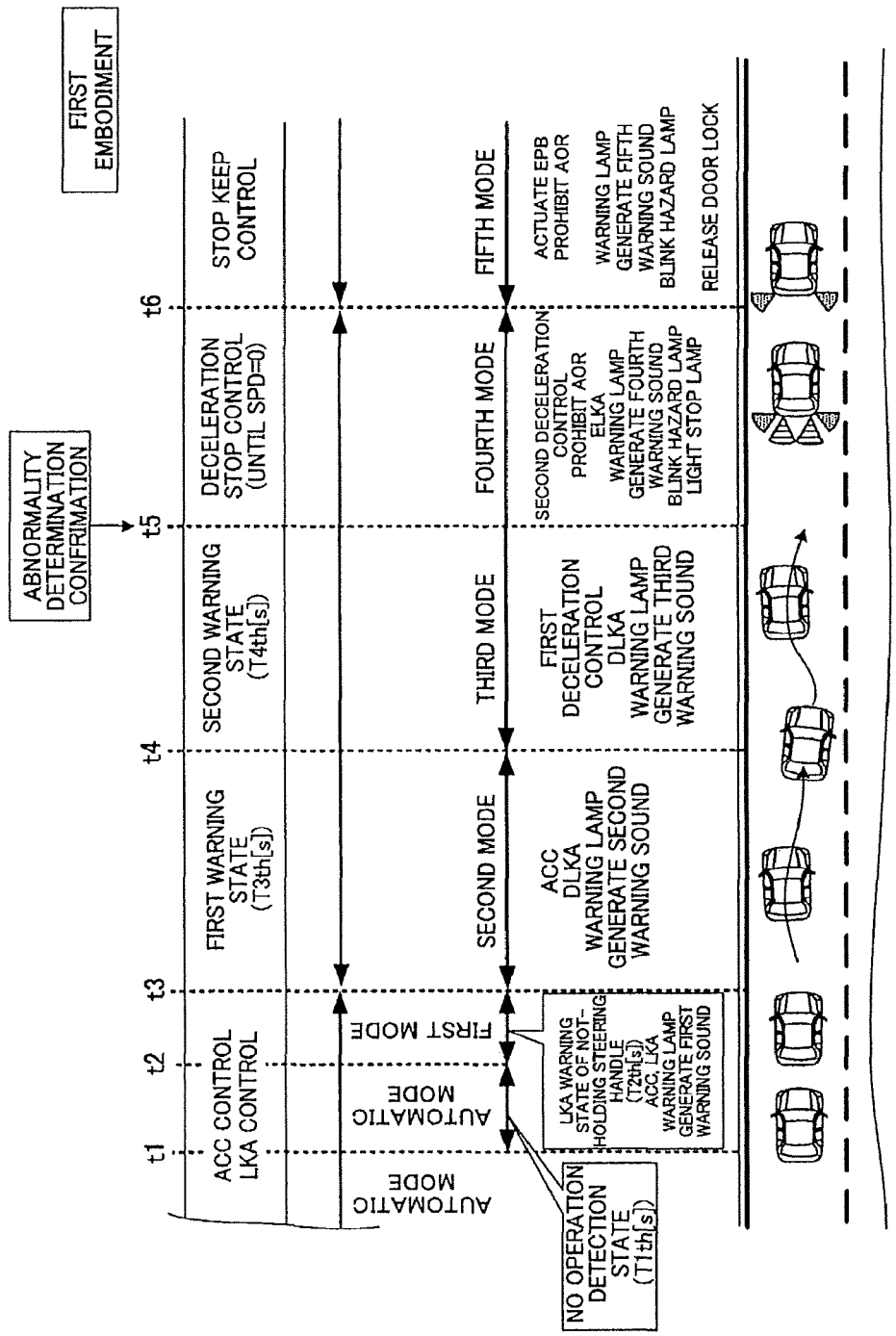
FIG. 4 is a time chart for describing an operation of the first apparatus.

More specifically, the driving support ECU 10 makes the buzzer 71 generate a first warning sound and makes a warning lamp light on the indicator 21 when the time t2 shown in FIG. 4 arrives. The warning lamp may be a message or a mark with a content of "urging the driver to hold the steering wheel". The first warning sound is a buzzer sound repeatedly generated and stopped at/with a predetermined interval. Note that at this stage, the driving support ECU 10 continuously performs both of the traffic lane keeping control and the trailing inter-vehicle distance control. A mode in which the above driving is performed is a first mode. In this first mode, the driving support ECU 10 determines whether or not the state in which the steering torque Tra is zero ("0") continues for a time longer than or equal to a second threshold time T2th. The second threshold time T2th is two seconds, for example, and is shorter than the first threshold time T1th.

<<Second Mode>>

When, in the first mode, the state in which the steering torque Tra is zero ("0") continues for the time longer than or equal to the second threshold time T2th at a time t3, the driving support ECU 10 changes the driving mode from the first mode to a second mode.

In the second mode, the driving support ECU 10 makes the buzzer 71 generate a second warning sound and makes the "warning lamp" blink on the indicator 21. The second warning sound is a buzzer sound repeatedly generated and stopped every time a time interval shorter than the time interval of the first warning sound elapses, and the sound thereof is louder than the first warning sound.

In the second mode, the driving support ECU 10 continues the trailing inter-vehicle distance control, but terminates the traffic lane keeping control (the traffic lane keeping control under a normal state), and initiates a traffic lane keeping control in the midst of a determination of abnormality in place of that traffic lane keeping control under a normal state. The traffic lane keeping control in the midst of a determination of abnormality will be also referred to as a "DLKA" for convenience sake in the present specification. Further, the traffic lane keeping control in the automatic mode and in the first mode may be referred to as the traffic lane keeping control under a normal state in order to be distinguished from the traffic lane keeping control in the midst of a determination of abnormality.

The traffic lane keeping control in the midst of a determination of abnormality is a control similar to the aforementioned traffic lane keeping control under a normal state. However, a target yaw rate YRc* in the traffic lane keeping control in the midst of a determination of abnormality is calculated in such a manner that the target yaw rate YRc* is larger than the target yaw rate YRc* calculated in the traffic lane keeping control under a normal state. That is, the target yaw rate YRc* in the traffic lane keeping control in the midst of a determination of abnormality is calculated by a following formula (4) below. Here, K1d, K2d and K1d are control gains. Magnitudes of the control gains K1d, K2d and K3d are larger than magnitudes of the control gains K1, K2 and K3 in the above formula (1), respectively (K1d>K1, K2d>K2, K3d>K3).

$$YRc^* = K1d \times Dc + K2d \times \theta y + K3d \times v \quad (4)$$

Further, in this second mode, the driving support ECU 10 determines whether or not a state-with-no-driving-operation (a non-driving operating state) continues for a time longer than or equal to a third threshold time T3th. The state-with-no-driving-operation is a state where none of parameters consisting of a combination of one or more of "the accelerator pedal operation amount AP, the brake pedal operation amount BP, and the steering torque Tra" changes. In the present example, the driving support ECU 10 determines whether or not the state-with-no-driving-operation continues for more than or equal to the third threshold time T3th by determining whether or not a state where none of "the accelerator pedal operation amount AP, the brake pedal operation amount BP, and the steering torque Tra" changes continues for a time longer than or equal to the third threshold time T3th. The third threshold time T3th is 30 seconds, for example, and is considerably longer than any one of the first threshold time T1th and the second threshold time T2th.

It is needless to say that the driving support ECU 10 may determine whether or not the state-with-no-driving-operation continues for the time loner than or equal to the third threshold time T3th by determining whether or not a state where the steering torque Tra is zero ("0") continues for the time loner than or equal to the third threshold time T3th.

As described above, according to the traffic lane keeping control in the midst of a determination of abnormality which is performed in the second mode, the target yaw rate YRc* is larger than "the target yaw rate YRc*s according to the traffic lane keeping controls in the automatic mode and in the first mode", thereby a large yaw rate is generated in the vehicle. Therefore, an operation of the steering wheel by the driver is urged. Thereby, it is likely that the steering wheel is operated unless the driver is in the abnormal state, and therefore, in the second mode, it is more clearly/certainly determined whether or not the driver is in the abnormal state.

<<Third Mode>>

In the second mode, when the state-with-no-driving-operation continues for the time longer than or equal to the third threshold time T3th at a time t4, the driving support ECU 10 changes the driving mode from the second mode to a third mode.

In the third mode, the driving support ECU 10 makes the buzzer 71 generate a third warning sound and makes the "warning lamp" blink on the indicator 21. The third warning sound is a buzzer sound repeatedly generated and stopped every time a time interval shorter than the time interval of the second warning sound elapses, and the sound thereof is louder than the second warning sound.

In the third mode, as is the case of the second mode, the traffic lane keeping control in the midst of a determination of abnormality is continued. In this case, the target yaw rate $YRc^*$ in the traffic lane keeping control in the midst of a determination of abnormality may be calculated so as to be larger than the target yaw rate $YRc^*$ in the traffic lane keeping control in the second mode described above. That is, in the traffic lane keeping control in the midst of a determination of abnormality in the third mode, the target yaw rate $YRc^*$ may be calculated by a following formula (5). Here, K1e, K2e and K3e are control gains. Magnitudes of the control gains K1e, K2e and K3e are larger than or equal to the magnitudes of the control gains K1d, K2d and K3d in the above formula (4), respectively (K1e>K1d, K2e>K2d, K3e>K3d).

$$YRc^*=K1e \times Dc+K2e \times \theta y+K3e \times v \quad (5)$$

Further, in the third mode, the driving support ECU 10 stops the trailing inter-vehicle distance control, and performs a first deceleration control in place of the trailing inter-vehicle distance control. The first deceleration control is a control which gradually decelerates the vehicle at a first deceleration α1 (a control which sets the target acceleration Gtgt to/at −α1) (for example, α1=0.5 m/s²). In this case as well, the driving support ECU 10 controls the engine actuator 21 using the engine ECU 20 and controls the brake actuator 31 using the brake ECU 30 in such a manner that a deceleration of the vehicle matches with (becomes equal to) the first deceleration.

In addition, in the third mode, the driving support ECU 10 determines whether or not the state-with-no-driving-operation continues for a time longer than or equal to a fourth threshold time T4th. The fourth threshold time T4th is 30 seconds, for example, and is considerably longer than any one of the first threshold time T1th and the second threshold time T2th. The fourth threshold time T4th may be equal to the third threshold time T3th or may be different from the third threshold time T3th.

As described above, according to the traffic lane keeping control in the midst of a determination of abnormality which is performed in the third mode, the target yaw rate is larger than or equal to "the target yaw rate according to the traffic lane keeping control in the midst of a determination of abnormality in the second mode", thereby a much lager yaw rate is generated in the vehicle. Thus, the driver is much more strongly urged to operate the steering wheel. In addition, in the third mode, the vehicle speed gradually decreases due to the first deceleration control. Therefore, it is likely that the driver notices this deceleration state if the driver is not in the abnormal state, and as a result, it is likely that the driver performs a driving operation such as increasing the accelerator pedal operation amount AP and the like. Accordingly, in the third mode, it is even more clearly/certainly determined whether or not the driver is in the abnormal state.

<<Fourth Mode>>

In the third mode, when the state-with-no-driving-operation continues for the time longer than or equal to the fourth threshold time T4th at a time t5, the driving support ECU 10 finalize the determination that the driver is in the abnormal state (the driving support ECU 10 determines that the driver has fallen into the abnormal state.). Thereafter, the driving support ECU 10 changes the driving mode from the third mode to a fourth mode.

In the fourth mode, the driving support ECU 10 makes the buzzer 71 generate a fourth warning sound and makes the "warning lamp" blink on the indicator 21. The fourth warning sound is a continuous buzzer sound, and the sound thereof is louder than the third warning sound.

In the fourth mode, the driving support ECU 10 stops the traffic lane keeping control in the midst of a determination of abnormality, and performs a traffic lane keeping control after confirmation of abnormality in place of the traffic lane keeping control in the midst of a determination of abnormality. The traffic lane keeping control after confirmation of abnormality is also referred to as an "ELKA" for convenience sake in the present specification. The traffic lane keeping control after confirmation of abnormality is the same control as the traffic lane keeping control performed in the automatic mode, but is not stopped even when the state-with-no-driving-operation continues.

Further, in the fourth mode, the driving support ECU 10 stops the first deceleration control, and performs a second deceleration control in place of the first deceleration control. The second deceleration control is a control which gradually decelerates the vehicle at "a second deceleration α2 larger than the first deceleration" (a control which sets the target acceleration Gtgt to/at −α2) (for example, α2=1 m/s²). In this case as well, the driving support ECU 10 controls the engine actuator 21 using the engine ECU 20 and controls the brake actuator 31 using the brake ECU 30 in such a manner that the deceleration of the vehicle matches with (becomes equal to) the second deceleration.

In addition, in the fourth mode, the driving support ECU 10 makes the hazard lamp 61 blink and makes the stop lamp 62 light, using the meter ECU 60.

In the fourth mode, the driving support ECU 10 prohibits the vehicle from accelerating (including decelerating.) based on a change in the accelerator pedal operation amount AP as long as a "specific accelerator pedal operation as a specific driving operation" which will be described below is not detected, even when the accelerator pedal operation amount AP changes (that is, the driving support ECU 10 prohibits an acceleration override.). In other words, the driving support ECU 10 invalidates (ignores) a driving state change request (an acceleration request) based on an operation of the accelerator pedal as long as "the specific accelerator pedal operation" is not detected in the fourth mode. The driving support ECU 10 continues the fourth mode until the vehicle speed SPD becomes "0" (that is, until the vehicle stops). It should be noted that, when the acceleration override is permitted, the engine actuator 21 is operated in response to the driving state change request (the acceleration request)

based on the operation of the accelerator pedal, and the acceleration of the vehicle is changed in such a manner that the request is satisfied.

<<Fifth Mode>>

When the vehicle speed SPD becomes "0" in the fourth mode (refer to a time t6 shown in FIG. 4), the driving support ECU 10 changes the driving mode from the fourth mode to the fifth mode.

In the fifth mode, the driving support ECU 10 makes the buzzer 71 generate a fifth warning sound which is the same as the fourth warning sound, and makes the "warning lamp" blink on the indicator 21.

In the fifth mode, the driving support ECU 10 stops both of the traffic lane keeping control after confirmation of abnormality and the second deceleration control, and add the parking brake force to each of the wheels using EPB ECU 40. That is, the driving support ECU 10 maintains the own vehicle in the stop state. Further, the driving support ECU 10 may release a lock of each of doors of the vehicle using a non-illustrated door lock ECU.

In addition, in the fifth mode, the driving support ECU 10 makes the hazard lamp 61 blink using the meter ECU 60. At this time, the driving support ECU 10 may make the stop lamp 62 light or blink.

Further, the driving support ECU 10 invalidates the operation of the accelerator pedal (prohibits the acceleration override) as long as "the specific accelerator pedal operation" is not detected in the fifth mode, as is the case with the fourth mode.

<<Specific Accelerator Pedal Operation (Specific Driving Operation)>>

In the meantime, as described above, in the fourth mode and in the fifth mode, that are after the determination that the driver is in the abnormal state is confirmed/finalized, the driving support ECU 10 invalidates the operation of the accelerator pedal (that is, the ECU 10 prohibits the acceleration override) as long as the "specific accelerator pedal operation" is not detected. The specific accelerator pedal operation will be described below.

Figure 12:
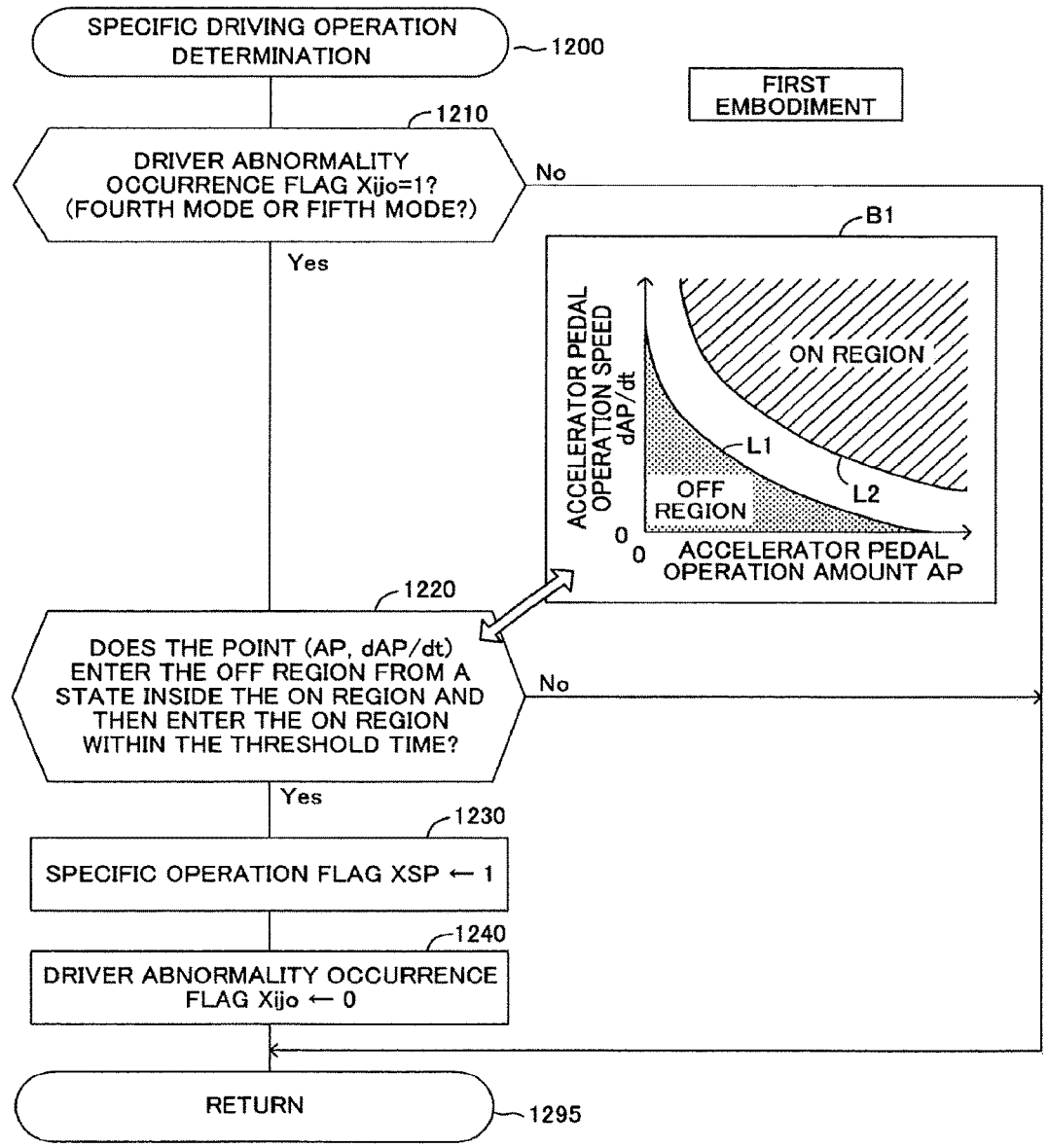
FIG. 12 is a flowchart showing a routine which the CPU of the first apparatus performs in order to determine whether or not a specific driving operation (a specific accelerator pedal operation) has occurred.

In the ROM of the driving support ECU 10, a graph for a determination of the specific driving operation (a graph for a determination of the specific accelerator pedal operation) shown in a block B1 of FIG. 12 is stored in a form of a map. A horizontal axis of this graph shows the accelerator pedal operation amount AP, and a vertical axis shows a time differential value of the accelerator pedal operation amount AP (a change amount per unit time of the accelerator pedal operation amount AP, and hereinafter will be also referred to as an "accelerator pedal operation speed".) dAP/dt.

In this graph, a region located on/in an origin (AP=0, dAP/dt=0) side with respect to a curved line L1 on which the accelerator pedal operation speed dAP/dt becomes smaller as the accelerator pedal operation amount AP becomes larger is defined as an "off region." For convenience sake, the curved line L1 may be referred to as a "first boundary line." When a point (AP, dAP/dt) defined by the accelerator pedal operation amount AP and the accelerator pedal operation speed dAP/dt is inside the off region, the accelerator pedal serving as one of driving operation elements can be regarded as not being operated. That is, in this case, it can be regarded that the accelerator pedal is in a non-operating state. In addition, a region located on/in a side opposite to the origin with respect to a curved line L2 is defined as an "on region". The line L2 is approximately parallel to the curved line L1, and is obtained by translating the curved line L1 in a direction where each of the accelerator pedal operation amount AP and the accelerator pedal operation speed dAP/dt becomes larger. For convenience sake, the curved line L2 may be referred to as a "second boundary line". When the point (AP, dAP/dt) is inside the on region, the accelerator pedal as the driving operation element can be regarded as being operated. That is, in this case, it can be regarded that the accelerator pedal is in an operating state. it should be noted that the curved line L1 and the curved line L2 may be the same line.

The CPU determines that the specific accelerator pedal operation (the specific driving operation) has occurred, when the point (AP, dAP/dt) defined by the accelerator pedal operation amount AP and the accelerator pedal operation speed dAP/dt enters the off region from the on region and thereafter enters the on region within a predetermined time (a certain threshold time Tath). The point (AP, dAP/dt) represents the accelerator pedal operational state. It should be noted that the state where the point (AP, dAP/dt) is inside the on region may be referred to as "an accelerator pedal on state or an accelerator pedal operating state", and the state where the point (AP, dAP/dt) is inside the off region may be referred to as "an accelerator pedal off state or an accelerator pedal non-operating state".

Therefore, for example, when the point (AP, dAP/dt) is inside the off region, and then enters the on region at a time ta, and then enters the off region, and further enters the on region at a time tb, and if a time from the time ta to the time tb is equal to or shorter than (within) the threshold time Tath, the driving support ECU 10 determines that the specific accelerator pedal operation has occurred. In general, such an operation of the accelerator pedal is not made by the driver who has fallen into the abnormal state.

When the driving support ECU 10 determines that the specific accelerator pedal operation has occurred, the driving support ECU 10 cancels the determination that the driver became the abnormal state, changes the driving mode to a normal mode, stops the deceleration control (the second deceleration control) or stops an EPB actuation, turns off the warning lamp, the hazard lamp 61 and the lighting stop lamp 62, stops the generation of the warning sound, and permits the acceleration override. That is, the driving support ECU 10 permits a normal driving control of the vehicle based on an operation of the driving operation elements (the accelerator pedal, the brake pedal, the steering wheel, and the like) by the driver.

(Concrete Operation)

Next, the concrete operation of the CPU of the driving support ECU 10 will be described. The CPU is configured to perform each of routines shown by flowcharts in FIG. 5 to FIG. 12 every time a predetermined period of time elapses.

Figure 5:
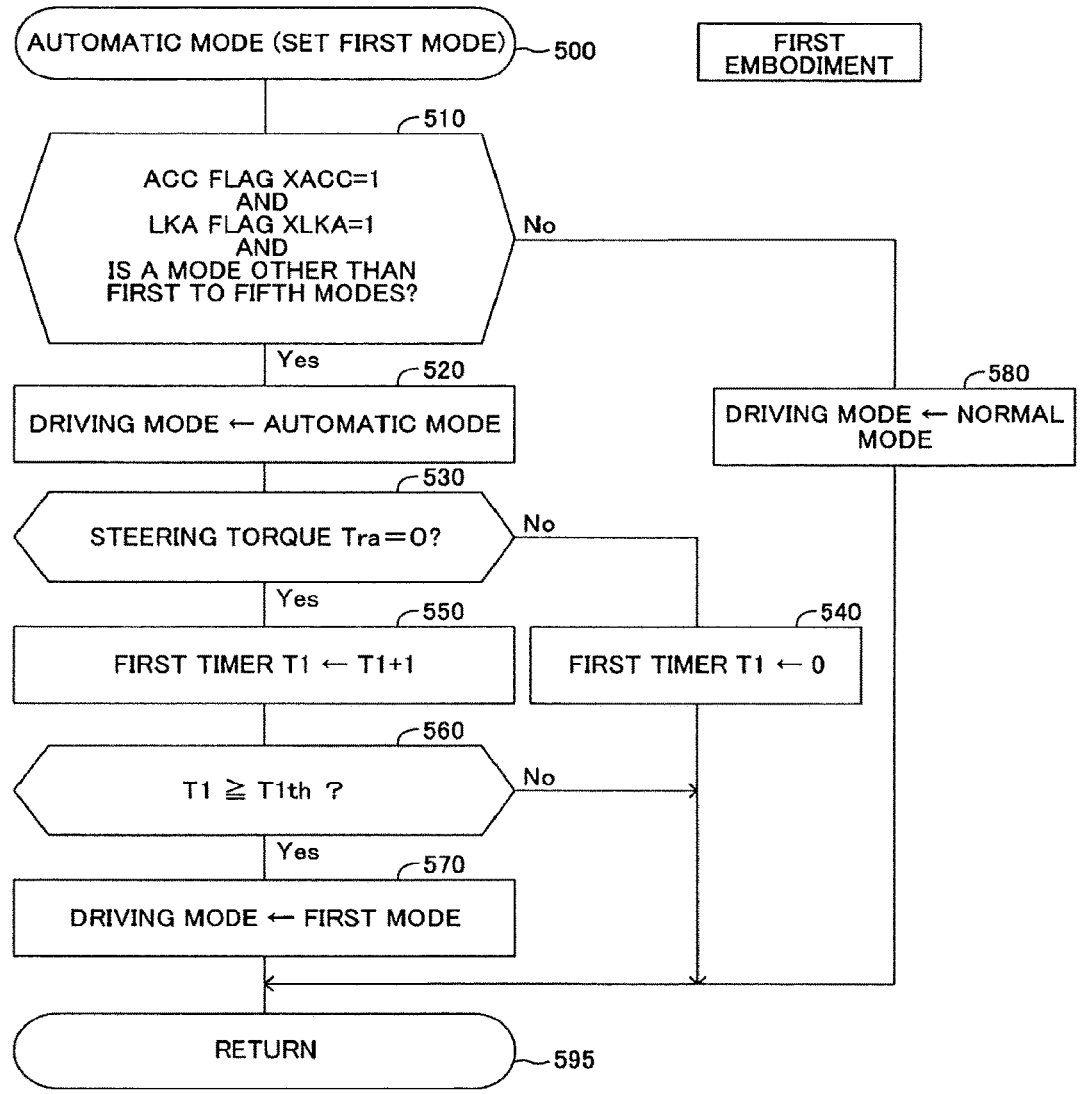
FIG. 5 is a flowchart showing a routine which CPU of the first apparatus performs in an automatic mode.

Therefore, when a predetermined point in time arrives, the CPU starts processing with a step 500 in FIG. 5, and proceeds to a step 510 to determine whether or not a value of an ACC flag XACC is "1", a value of an LKA flag XLKA is "1", and the driving mode is neither of the first to the fifth modes.

The value of the flag XACC and the value of the flag XLKA are configured to be set to "0" in an initialization routine performed by the CPU when a non-illustrated ignition key switch is changed from an off position to an on position. Further, the value of the flag XACC is configured to be changed to "1" when the operation switch 18 is operated to be set to perform the trailing inter-vehicle distance control, and the value of the flag XLKA is configured to be changed to "1" when the operation switch 18 is operated to be set to perform the traffic lane keeping control.

Assume that a current time is a time immediately after both the value of the flag XACC and the value of the flag XLKA have been set to "1" for the first time after the ignition key switch were changed from the off position to the on position. In this case, the driving mode is neither of the first to the fifth modes. Therefore, the CPU makes a "Yes" determination at the step 510, and proceeds to a step 520 to set the driving mode to the automatic mode. Subsequently, the CPU proceeds to a step 530 to determine whether or not the operation of the steering wheel is not being made (the steering torque Tra is "0", and thus, a current state is in a state in which the steering wheel is not temporarily being held) at the current time. It should be noted that the CPU may determine that the operation of the steering wheel is not being made when an absolute value of the steering torque Tra is less than or equal to an infinitesimal positive threshold value Trsth at the step 530.

At this time, if the operation of the steering wheel is made, and therefore, the steering torque Tra is not "0", the CPU makes a "No" determination at the step 530, and proceeds to a step 540 to set (clears) a value of a first timer T1 to "0". Thereafter, the CPU proceeds to a step 595 to tentatively terminate the present routine. It should be noted that the value of the first timer T1 is configured to be set to "0" at the aforementioned initialization routine.

In contrast, if the steering torque Tra is "0", the CPU makes a "Yes" determination at the step 530, and proceeds to a step 550 to increase the value of the first timer T1 by "1." Therefore, the value of the first time T1 represents a duration time of a state where the steering torque Tra is "0" (that is, the duration time of the state in which the steering wheel is not held) in the automatic mode.

Subsequently, the CPU proceeds to a step 560 to determine whether or not the value of the first time T1 is more than or equal to the first threshold time T1th. When the value of the first time T1 is less than the first threshold time T1th, the CPU makes a "No" determination at the step 560, and proceeds to the step 595 to tentatively terminate the present routine.

In contrast, when the state where the steering torque Tra is "0" in the automatic mode continues for the first threshold time T1th, the CPU makes a "Yes" determination at the step 560 to proceed to a step 570, at which the CPU sets the driving mode to the first mode. That is, the CPU changes the driving mode from the automatic mode to the first mode. Thereafter, the CPU proceeds to the step 595 to tentatively terminate the present routine.

It should be noted that in a case where the determination condition of the step 510 is not satisfied at a point in time when the CPU performs the process of the step 510, the CPU makes a "No" determination at the step 510 to proceed to a step 580, at which the CPU sets the driving mode to the normal mode, and proceeds to the step 595 to tentatively terminate the present routine. It should be noted that when the value of the flag XACC is "1" in the normal mode, the trailing inter-vehicle distance control is performed, however, the acceleration override is permitted. Further, when the value of the flag XLKA is "1" in the normal mode, the traffic lane keeping control is performed. In this case, the acceleration request based on the accelerator pedal operation amount AP is not ignored, and an acceleration control in response to the accelerator pedal operation amount AP is performed.

Figure 6:
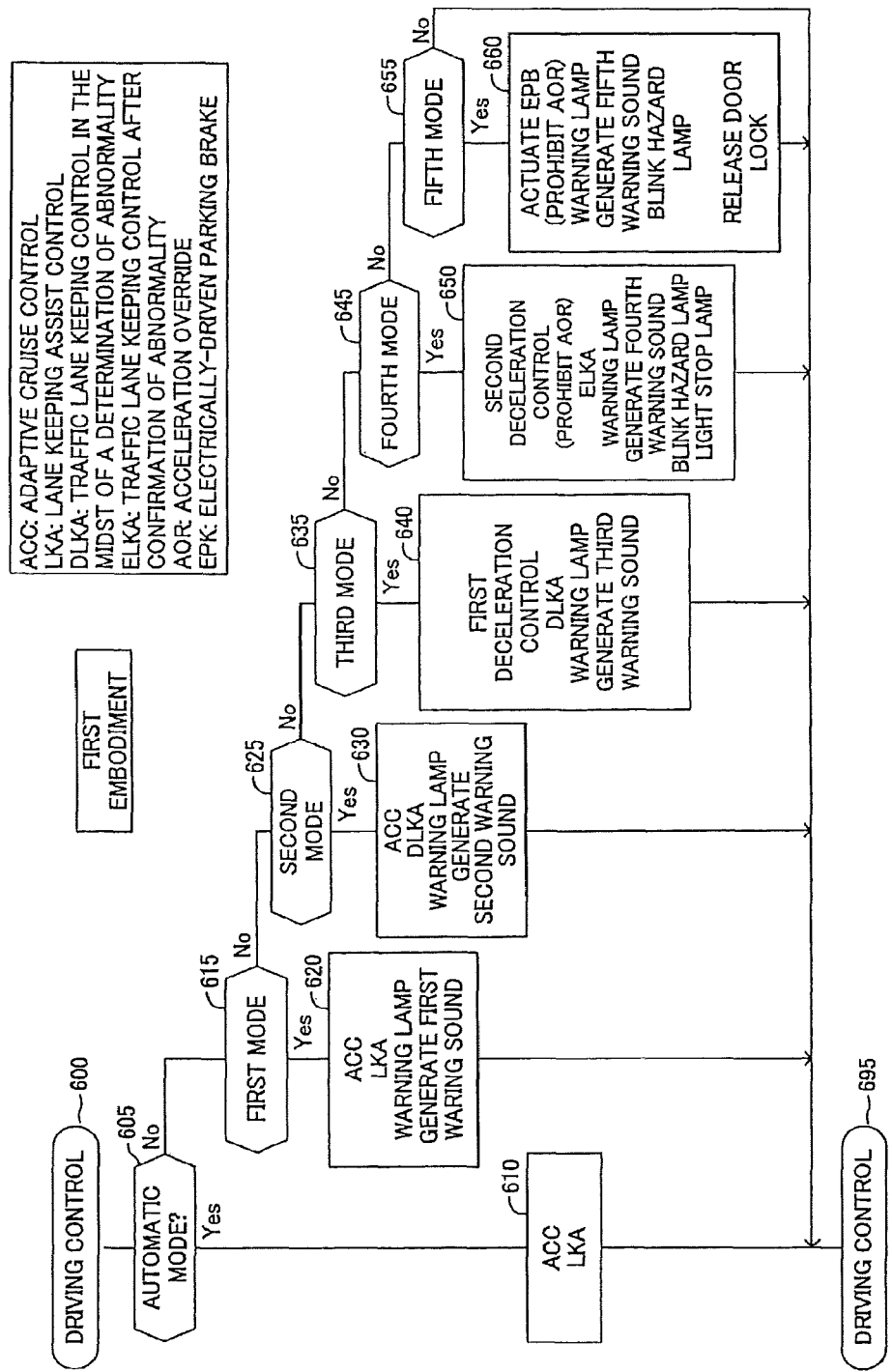
FIG. 6 is a flowchart showing a routine which the CPU of the first apparatus performs in order to conduct a driving control.

In the meantime, when a predetermined point in time arrives, the CPU starts processing with a step 600 in FIG. 6, and proceeds to a step 605 to determine whether or not the driving mode is set at the automatic mode. When the driving mode is set at the automatic mode by the process of the step 520 in FIG. 5, the CPU makes a "Yes" determination at the step 605 to proceed to a step 610, at which the CPU performs both of the trailing inter-vehicle distance control (ACC) and the traffic lane keeping control under a normal state (LKA). That is, the CPU performs processes of the automatic mode. Thereafter, the CPU proceeds to a step 695 to tentatively terminate the present routine.

In contrast, when the driving mode is set at the first mode by the process of the step 570 in FIG. 5, the CPU makes a "No" determination at the step 605, and makes a "Yes" determination at a step 615, at which the CPU performs a process of determining whether or not the driving mode is set to the first mode. In this case, the CPU proceeds to a step 620 to perform both of the trailing inter-vehicle distance control and the traffic lane keeping control under a normal state, light the warning lamp, and generate the first warning sound. That is, the CPU performs processes of the first mode. Thereafter, the CPU proceeds to a step 695 to tentatively terminate the present routine.

Figure 7:
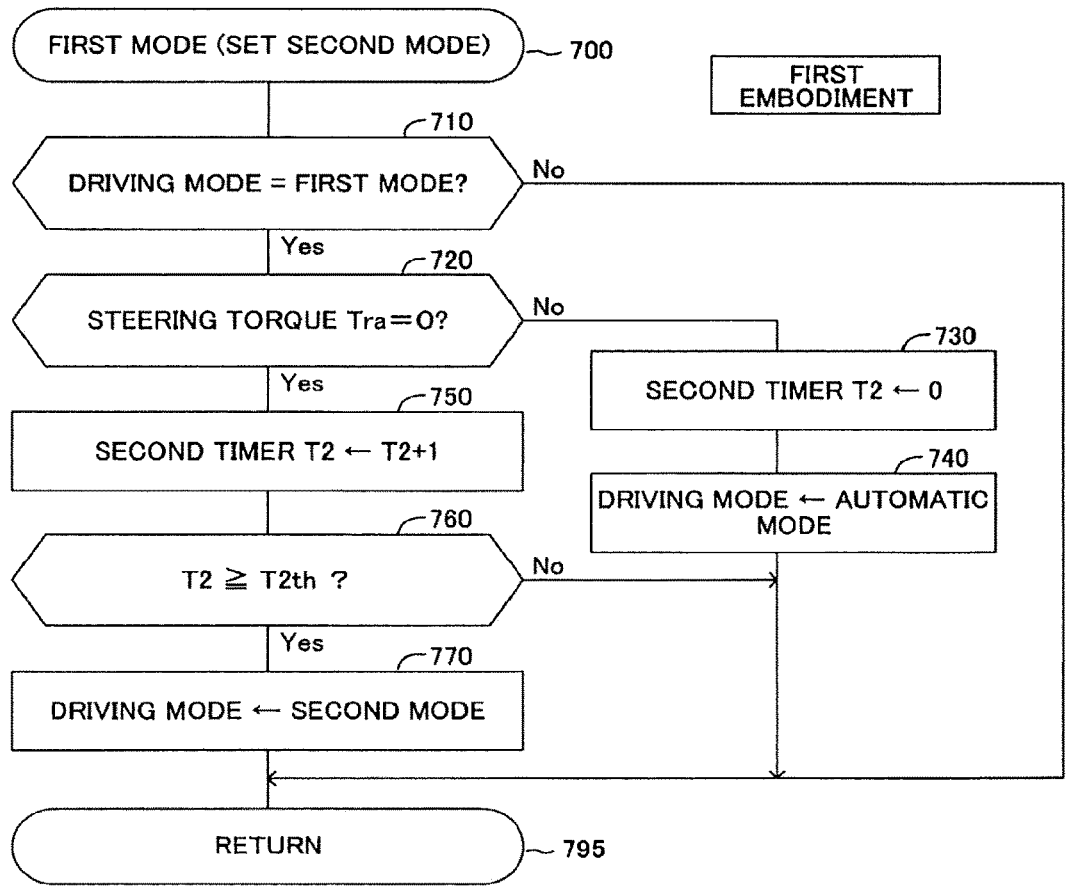
FIG. 7 is a flowchart showing a routine which the CPU of the first apparatus performs in a first mode.

Further, when a predetermined point in time arrives, the CPU starts processing with a step 700 in FIG. 7, and proceeds to a step 710 to determine whether or not the driving mode is set at the first mode. When the driving mode is not set at the first mode, the CPU makes a "No" determination at the step 710 to directly proceed to a step 795, at which the CPU tentatively terminates the present routine. In contrast, when the driving mode is set at the first mode, the CPU makes a "Yes" determination at the step 710 to proceed to a step 720, at which the CPU determines whether or not the operation of the steering wheel is not being made (the steering torque Tra is "0", and thus, the current state is in the state in which the steering wheel is not temporarily being held) at the current time. It should be noted that the CPU may determine that the operation of the steering wheel is not being made when the absolute value of the steering torque Tra is less than or equal to the infinitesimal positive threshold value Trsth at the step 720.

At this time, if the operation of the steering wheel is made, and thus, the steering torque Tra is not "0", the CPU makes a "No" determination at the step 720 to proceed to a step 730, at which the CPU sets (clears) a value of a second timer T2 to "0". It should be noted that the value of the second timer T2 is configured to be set to "0" at the aforementioned initialization routine. Subsequently, the CPU proceeds to a step 740 to change (bring back) the driving mode from the first mode to the automatic mode. Thereafter, the CPU proceeds to a step 795 to tentatively terminate the present routine.

In contrast, when the steering torque Tra is "0", the CPU makes a "Yes" determination at the step 720 to proceed to a step 750, at which the CPU increases the value of the second timer T2 by "1." Therefore, the value of the second timer T2 represents a duration time of a state where the steering torque Tra is "0" (that is, the duration time of the state in which the steering wheel is not held) in the first mode.

Subsequently, the CPU proceeds to a step 760 to determine whether or not the value of the second timer T2 is more than or equal to the second threshold time T2th. When the value of the second timer T2 is less than the second threshold time T2th, the CPU makes a "No" determination at the step 760 to proceed to the step 795, at which the CPU tentatively terminates the present routine.

In contrast, when the state where the steering torque Tra is "0" in the first mode continues for the second threshold time T2th, the CPU makes a "Yes" determination at the step 760 to proceed to a step 770, at which the CPU sets the driving mode to the second mode. That is, the CPU changes the driving mode from the first mode to the second mode. Thereafter, the CPU proceeds to the step 795 to tentatively terminate the present routine.

When the driving mode is set to the second mode in the aforementioned manner, the CPU makes a "No" determination at both of the step 605 and the step 615 in FIG. 6, and makes a "Yes" determination at a step 625, at which the CPU performs a process of determining whether or not the driving mode is set at the second mode. In this case, the CPU proceeds to a step 630 to perform both of the trailing inter-vehicle distance control (ACC) and the traffic lane keeping control in the midst of a determination of abnormality (DLKA), light the warning lamp, and generate the second warning sound. That is, the CPU performs processes of the second mode. Thereafter, the CPU proceeds to the step 695 to tentatively terminate the present routine.

Figure 8:
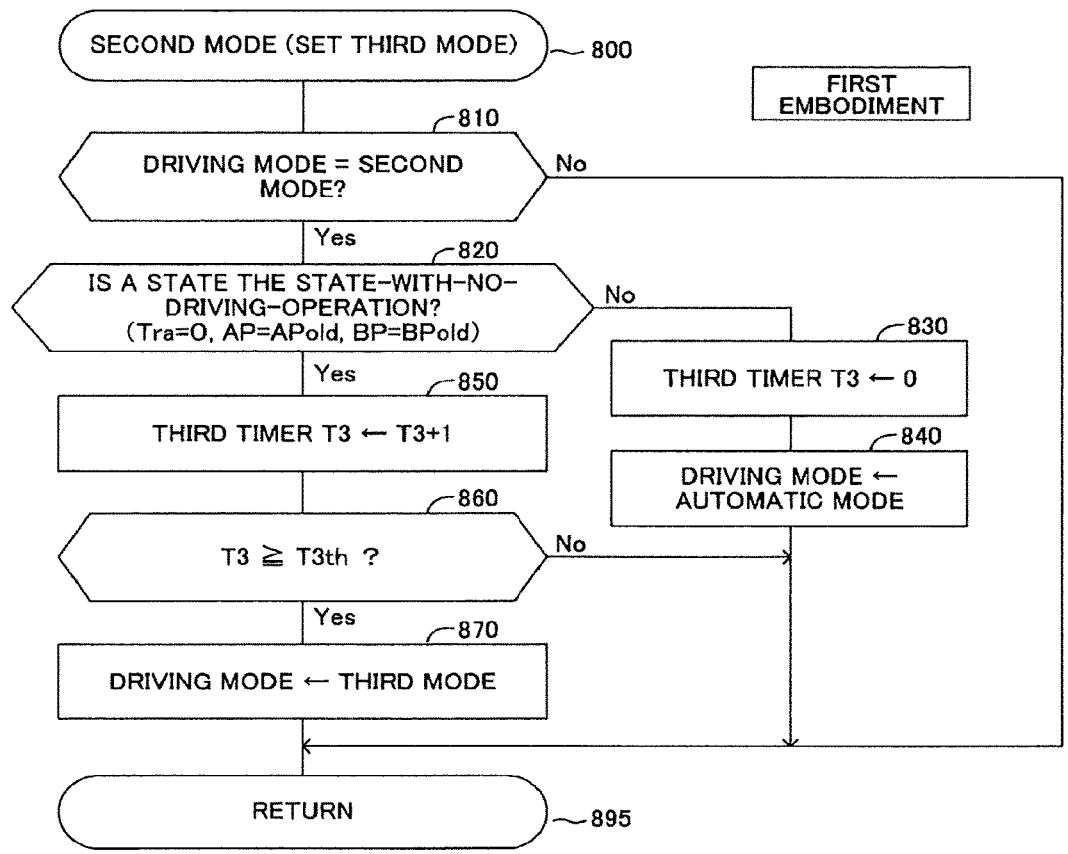
FIG. 8 is a flowchart showing a routine which the CPU of the first apparatus performs in a second mode.

Further, when a predetermined point in time arrives, the CPU starts processing with a step 800 in FIG. 8, and proceeds to a step 810 to determine whether or not the driving mode is set at the second mode. When the driving mode is not set at the second mode, the CPU makes a "No" determination at the step 810 to directly proceed to a step 895, at which the CPU tentatively terminates the present routine.

In contrast, when the driving mode is set at the second mode, the CPU makes a "Yes" determination at the step 810, and proceeds to a step 820 to determine whether or not a state at the current time is the state-with-no-driving-operation. As mentioned above, the state-with-no-driving-operation is the state where all of states described below are established.
(state 1) The steering torque Tra is "0" (the absolute value of the steering torque Tra may be less than or equal to the infinitesimal positive threshold value Trsth.).
(state 2) The accelerator pedal operation amount AP at the current time is equal to an accelerator pedal operation amount APold a predetermined time prior to the current time.
(state 3) The brake pedal operation amount BP at the current time is equal to a brake pedal operation amount BPold a predetermined time prior to the current time.

It should be noted that the CPU may determine a state where only either one or two of the state 1 to the state 3 are established to be the state-with-no-driving-operation.

At this time, if the driving operation is made, and thus, the state at the current time is not the state-with-no-driving-operation (in other words, if the state at the current time is the driving operating state), the CPU makes a "No" determination at the step 820 to proceed to a step 830, at which the CPU sets (clears) a value of a third timer T3 to "0". It should be noted that the value of the third timer T3 is configured to be set to "0" at the aforementioned initialization routine. Subsequently, the CPU proceeds to a step 840 to change (bring back) the driving mode from the second mode to the automatic mode. Thereafter, the CPU proceeds to a step 895 to tentatively terminate the present routine.

In contrast, when the state at the current time is the state-with-no-driving-operation, the CPU makes a "Yes" determination at the step 820 to proceeds to a step 850, at which the CPU increases the value of the third timer T3 by "1." Therefore, the value of the third timer T3 represents a duration time of the state-with-no-driving-operation in the second mode.

Subsequently, the CPU proceeds to a step 860 to determine whether or not the value of the third timer T3 is more than or equal to the third threshold time T3th. In a case when the value of the third timer T3 is less than the third threshold time T3th, the CPU makes a "No" determination at the step 860, and proceeds to the step 895, at which the CPU tentatively terminates the present routine.

In contrast, when the state-with-no-driving-operation continues for the third threshold time T3th in the second mode, the CPU makes a "Yes" determination at the step 860 to proceed to a step 870, at which the CPU sets the driving mode to the third mode. That is, the CPU changes the driving mode from the second mode to the third mode. Thereafter, the CPU proceeds to the step 895 to tentatively terminate the present routine.

When the driving mode is set to the third mode in the aforementioned manner, the CPU makes a "No" determination at any of the step 605, the step 615, and the step 625 in FIG. 6, and makes a "Yes" determination at a step 635, at which the CPU performs a process of determining whether or not the driving mode is set at the third mode. In this case, the CPU proceeds to a step 640 to perform both of the first deceleration control and the traffic lane keeping control in the midst of a determination of abnormality (DLKA), light the warning lamp, and generate the third warning sound. That is, the CPU performs processes of the third mode. Thereafter, the CPU proceeds to the step 695 to tentatively terminate the present routine.

Figure 9:
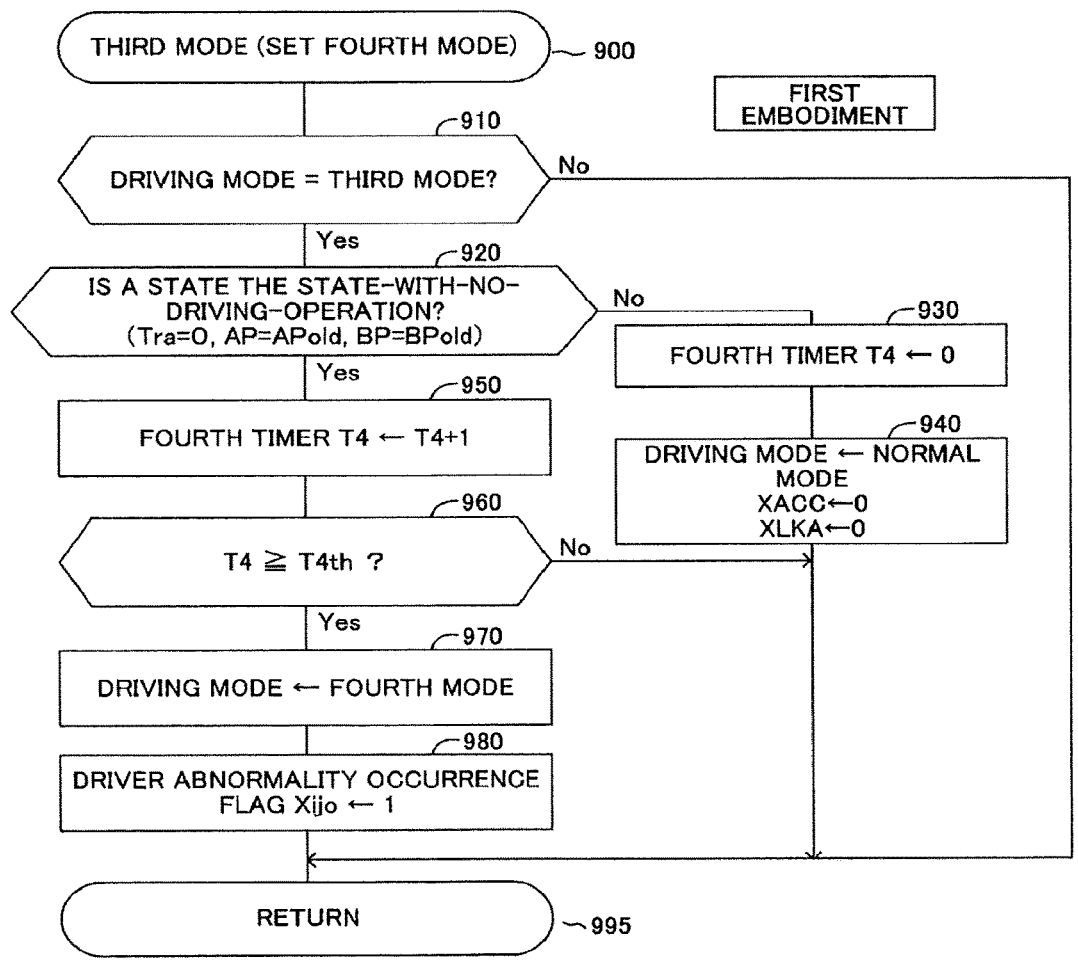
FIG. 9 is a flowchart showing a routine which the CPU of the first apparatus performs in a third mode.

Further, when a predetermined point in time arrives, the CPU starts processing with a step 900 in FIG. 9, and proceeds to a step 910 to determine whether or not the driving mode is set at the third mode. When the driving mode is not set at the third mode, the CPU makes a "No" determination at the step 910 to directly proceed to a step 995, at which the CPU tentatively terminates the present routine.

In contrast, when the driving mode is set at the third mode, the CPU makes a "Yes" determination at the step 910 to proceed to a step 920, at which the CPU determines whether or not the state at the current time is the state-with-no-driving-operation, as is the case with the aforementioned step 820.

At this time, if the driving operation is made, and thus, the state at the current time is not the state-with-no-driving-operation (in other words, if the state at the current time is the driving operating state), the CPU makes a "No" determination at the step 920 to proceed to a step 930, at which the CPU sets (clears) a value of a fourth timer T4 to "0". It should be noted that the value of the fourth timer T4 is configured to be set to "0" at the aforementioned initialization routine. Subsequently, the CPU proceeds to a step 940 to change (bring back) the driving mode from the third mode to the normal mode and to set (clear) the values of the flag XACC and the flag XLKA to "0". Further, the CPU turns off the warning lamp, the stop lamp 62, and the hazard lamp 61, stops the generation of the warning sound, and permits the acceleration override. Thereafter, the CPU proceeds to the step 995 to tentatively terminate the present routine. As a result, the CPU starts the vehicle control based on the operation by the driver (the operation of the accelerator pedal, the operation of the brake pedal, and the operation of the steering wheel). In other words, the trailing inter-vehicle distance control and the traffic lane keeping control are both cancelled.

In contrast, when the state at the current time is the state-with-no-driving-operation, the CPU makes a "Yes" determination at the step 920 to proceed to a step 950, at which the CPU increases the value of the fourth timer T4 by "1." Therefore, the value of the fourth timer T4 represents a duration time of the state-with-no-driving-operation in the third mode.

Subsequently, the CPU proceeds to a step 960 to determine whether or not the value of the fourth timer T4 is more than or equal to the fourth threshold time T4th. When the value of the fourth timer T4 is less than the fourth threshold time T4th, the CPU makes a "No" determination at the step 960 to proceed to the step 995, at which the CPU tentatively terminates the present routine.

In contrast, when the state-with-no-driving-operation continues for the fourth threshold time T4th in the third mode, the CPU makes a "Yes" determination at the step 960 to proceed to a step 970, at which the CPU sets the driving mode to the fourth mode. That is, the CPU changes the driving mode from the third mode to the fourth mode. Subsequently, the CPU proceeds to a step 980 to set a value of a flag Xijo (a driver abnormality occurrence flag) which shows that the driver is confirmed to be in the abnormal state to "1." That is, the driving support ECU 10 finalizes/confirms the determination that the driver is in the abnormal state. It should be noted that the value of the flag Xijo is configured to be set to "0" in the initialization routine. Further, the value of the flag Xijo may be stored in the non-volatile memory (EEPROM, or backup RAM, and the like) which the driving support ECU 10 comprises. Thereafter, the CPU proceeds to the step 995 to tentatively terminate the present routine.

When the driving mode is set at the fourth mode in the aforementioned manner, the CPU makes a "No" determination at any of the step 605, the step 615, the step 625 and the step 635 in FIG. 6, and makes a "Yes" determination at a step 645, at which the CPU performs a process of determining whether or not the driving mode is set at the fourth mode. In this case, the CPU proceeds to a step 650 to perform both of the second deceleration control and the traffic lane keeping control after confirmation of abnormality (ELKA), prohibit the acceleration override, light the warning lamp, and generate the fourth warning sound. Further, the CPU makes the hazard lamp 61 blink, and makes the stop lamp 62 light. That is, the CPU performs processes of the fourth mode. Thereafter, the CPU proceeds to the step 695 to tentatively terminate the present routine.

Figure 10:
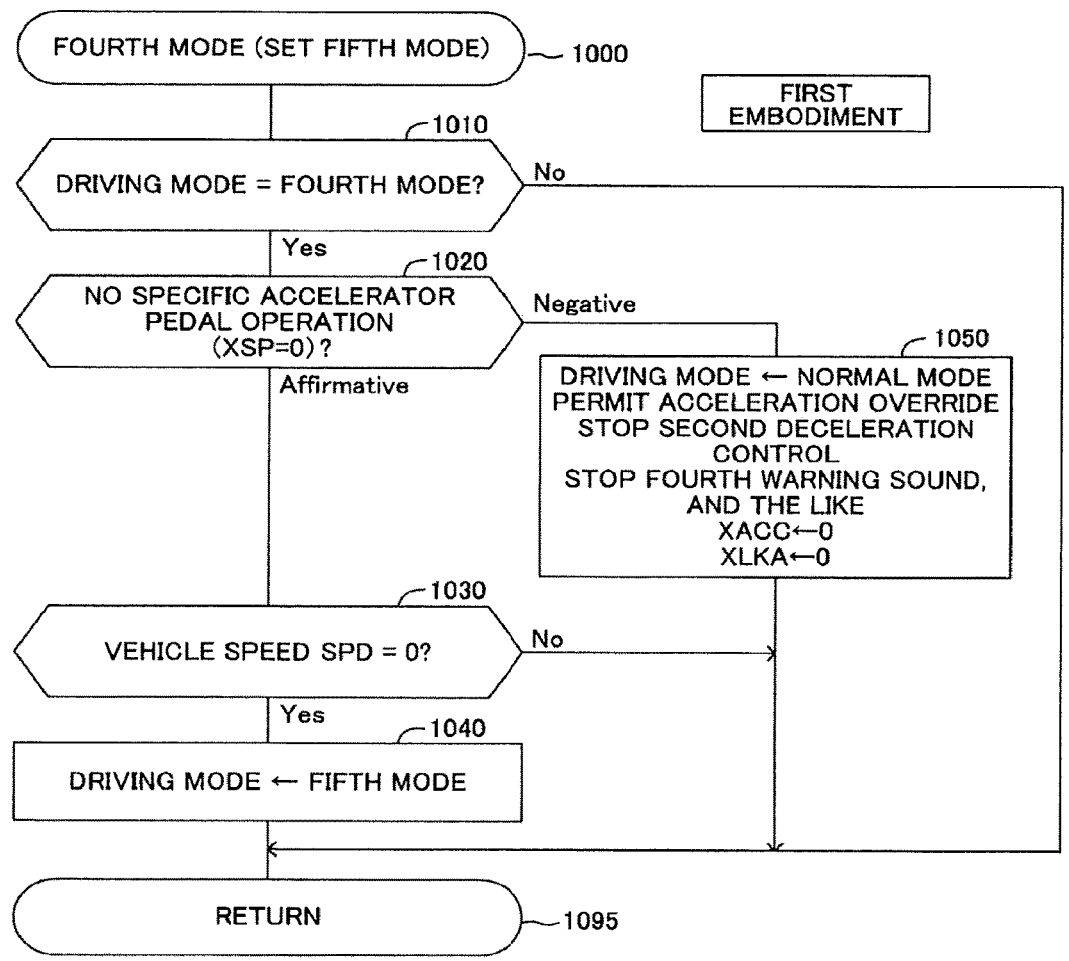
FIG. 10 is a flowchart showing a routine which the CPU of the first apparatus performs in a fourth mode.

In addition, when a predetermined point in time arrives, the CPU starts processing with a step 1000 in FIG. 10, and proceeds to a step 1010 to determine whether or not the driving mode is set at the fourth mode. When the driving mode is not set at the fourth mode, the CPU makes a "No" determination at the step 1010 to directly proceed to a step 1095, at which the CPU tentatively terminates the present routine.

In contrast, when the driving mode is set at the fourth mode, the CPU makes a "Yes" determination at the step 1010 to proceed to a step 1020, at which the CPU determine whether or not it is determined that the specific accelerator pedal operation has not occurred. Specifically, the CPU determines whether or not a value of a specific operation flag XSP is "0" at the step 1010. The value of the specific operation flag XSP is configured to be set to "0" in the aforementioned initialization routine, and is configured to be set to "1" when it is determined that the specific accelerator pedal operation has occurred. A method for setting this specific operation flag XSP (that is, a method for determining whether or not the specific accelerator pedal operation has occurred) will be described later with reference to FIG. 11.

At this time, when it is determined that the specific accelerator pedal operation has not occurred (that is, when the value of the specific operation flag XSP is "0"), the CPU makes an "Affirmative" determination at the step 1020 to proceed to a step 1030, at which the CPU determines whether or not the vehicle speed SPD is "0" (that is, whether or not the vehicle stops). If the vehicle speed SPD is not "0", the CPU makes a "No" determination at the step 1030 to directly proceed to the step 1095, at which the CPU tentatively terminates the present routine.

In contrast, when the vehicle speed SPD is "0" at a point in time when the CPU performs the process of the step 1030 (that is, when the vehicle stops), the CPU makes a "Yes" determination at the step 1030 to proceed to a step 1040, at which the CPU sets the driving mode to the fifth mode. That is, the CPU changes the driving mode from the fourth mode to the fifth mode. Thereafter, the CPU proceeds to the step 1095 to tentatively terminate the present routine.

When the driving mode is set at the fifth mode in the aforementioned manner, the CPU makes a "No" determination at any of the step 605, the step 615, the step 625, the step 635, and the step 645 in FIG. 6, and makes a "Yes" determination at a step 655, at which the CPU performs a process of determining whether or not the driving mode is set at the fifth mode. In this case, the CPU proceeds to a step 660 to add the parking brake force to each of the wheels using EPB ECU 40. Further, the CPU prohibits the acceleration override, lights the warning lamp, generates the fifth warning sound, makes the hazard lamp 61 blink, and releases the door lock. That is, the CPU performs processes of the fifth mode. Then, the CPU proceeds to the step 695 to tentatively terminate the present routine.

On the other hand, when it is determined that the specific accelerator pedal operation has occurred at a point in time when the CPU performs the process of the step 1020 in FIG. 10 (that is, when the value of the specific operation flag XSP is "1"), the CPU makes a "Negative" determination at the step 1020 to proceed to a step 1050. The CPU changes the driving mode from the fourth mode to the normal mode at this step 1050. Further, the CPU permits the acceleration override, stops the second deceleration control, stops the fourth warning sound, and sets (clears) the values of the flag XACC and the flag XLKA to both "0". At this time, the CPU may set the value of the specific operation flag XSP to "0". Thereafter, the CPU proceeds to the step 1095 to tentatively terminate the present routine. As a result, the CPU starts the vehicle control based only on the operation by the driver. In other words, the trailing inter-vehicle distance control and the traffic lane keeping control are both cancelled.

Figure 11:
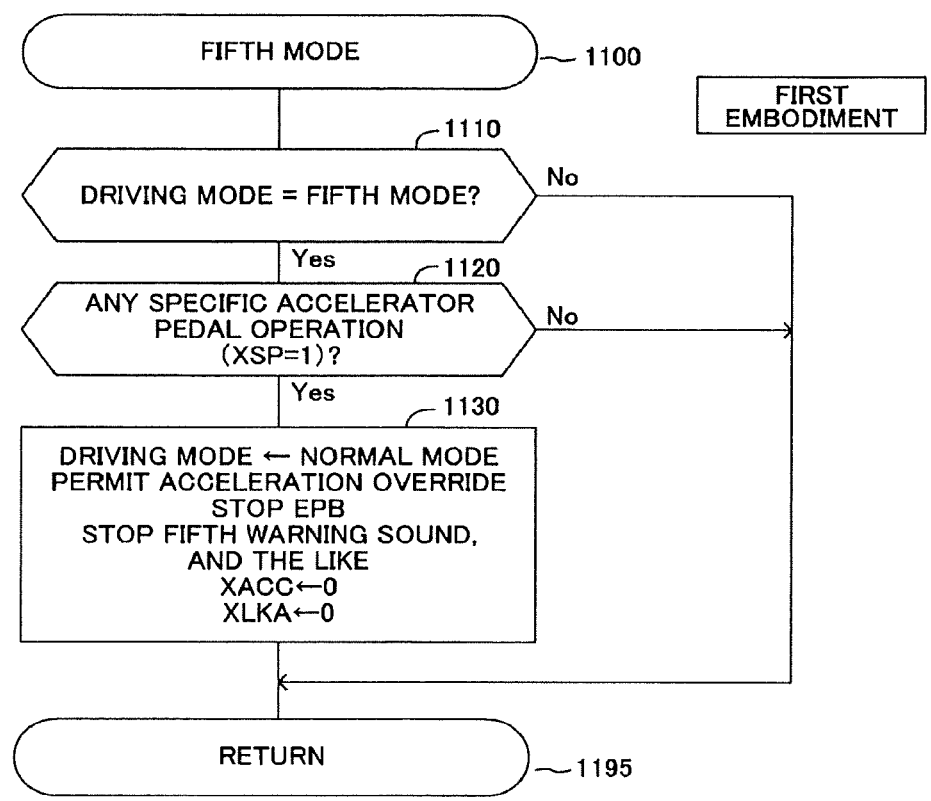
FIG. 11 is a flowchart showing a routine which the CPU of the first apparatus performs in a fifth mode.

Further, when a predetermined point in time arrives, the CPU starts processing with a step 1100 in FIG. 11, and proceeds to a step 1110 to determine whether or not the driving mode is set at the fifth mode. When the driving mode is not set at the fifth mode, the CPU makes a "No" determination at the step 1110, to directly proceed to a step 1195, at which the CPU tentatively terminates the present routine.

In contrast, when the driving mode is set at the fifth mode, the CPU makes a "Yes" determination at the step 1110, and proceeds to a step 1120 to determine whether or not it is determined that the specific accelerator pedal operation has occurred. Specifically, the CPU determines whether or not the value of the specific operation flag XSP is "1" at the step 1120.

At this time, when it is not determined that the specific accelerator pedal operation has occurred (that is, when the value of the specific operation flag XSP is "0"), the CPU makes a "No" determination at the step 1120 to directly proceed to the step 1195, at which the CPU tentatively terminates the present routine.

In contrast, when it is determined that the specific accelerator operation has occurred (that is, when the value of the specific operation flag XSP is "1"), the CPU makes a "Yes" determination at the step 1120 to proceed to a step 1130, at which the CPU changes (brings back) the driving mode from the fifth mode to the normal mode. Moreover, the CPU permits the acceleration override, releases the EPB, stops the fifth warning sound, and sets (clears) the values of the flag XACC and the flag XLKA to both "0". At this time, the CPU may set the value of the specific operation flag XSP to "0". Further, the CPU turns off the warning lamp and the hazard lamp 61. Thereafter, the CPU proceeds to the step 1195 to tentatively terminate the present routine. As a result, the CPU starts the vehicle control based only on the operation by the driver. In other words, the trailing inter-vehicle distance control and the traffic lane keeping control are both cancelled.

In the meantime, when a predetermined point in time arrives, the CPU starts processing with a step 1200 in FIG. 12, and proceeds to a step 1210 to determine whether or not the value of the driver abnormality occurrence flag Xijo is "1." When the value of the driver abnormality occurrence flag Xijo is "0", the CPU makes a "No" determination at the step 1210 to directly proceed to a step 1295, at which the CPU tentatively terminates the present routine. It should be noted that the CPU may determine whether or not the driving mode is set at either the fourth mode or the fifth mode at the step 1210. In this case, when the driving mode is not set at either the fourth mode or the fifth mode, the CPU makes a "No" determination at the step 1210 to directly proceed to the step 1295, at which the CPU tentatively terminates the present routine.

In contrast, when the value of the driver abnormality occurrence flag Xijo is set at "1" (or alternatively, when the driving mode is set at either the fourth mode or the fifth mode), the CPU makes a "Yes" determination at the step 1210 to proceed to a step 1220, at which the CPU determines whether or not the specific accelerator pedal operation has occurred according to the aforementioned method.

The CPU determines that the specific accelerator pedal operation has occurred when the point (AP, dAP/dt) which represents the operational state of the accelerator pedal 11a serving as the driving operation element enters the off region from a state inside the on region shown in the block B1, and then enters the on region within the predetermined time (the certain threshold time Tath). In other words, the CPU determines that the specific accelerator pedal operation has occurred, when it has been detected that the state of the accelerator pedal 11a changes from the accelerator pedal on state to the accelerator pedal off state, and further changes back to the accelerator pedal on state within the threshold time Tath.

When the CPU determines that the specific accelerator pedal operation has occurred at the step 1220, the CPU makes a "Yes" determination at the step 1220 to proceed to a step 1230, at which the CPU sets the value of the specific operation flag XSP to "1." It should be noted that the value of the specific operation flag XSP is configured to be set to "0" in the aforementioned initialization routine. Subsequently, the CPU proceeds to a step 1240 to set the value of the driver abnormality occurrence flag Xijo to "0". That is, the CPU cancels a determination result that the driver became the abnormal state, and proceeds to a step 1295 to tentatively terminate the present routine. It should be noted that the step 1240 may be omitted. That is, even when it is determined that the specific accelerator pedal operation has occurred, the CPU may not cancel the determination result that the driver abnormality occurred by maintaining the value of the driver abnormality occurrence flag Xijo to be "1".

In contrast, when the CPU does not determine that the specific accelerator pedal operation has occurred at the step 1220, the CPU makes a "No" determination at the step 1220, to directly proceed to the step 1295, at which the CPU tentatively terminates the present routine.

As is described above, the first apparatus can make the determination as to whether or not the driver has become the abnormal state, and stop the vehicle safely, while invalidating/ignoring the driving state change request based on the operation of the accelerator pedal serving as the driving operation element (that is, while prohibiting the acceleration override). Further, when it has been ensured that the driver is not in the abnormal state (that is, when it has been determined that the specific accelerator pedal operation has occurred) even after the determination that the driver is in the abnormal state was confirmed, the first apparatus can make the vehicle drive based on the driving state change request based on the operation of the accelerator pedal serving as the driving operation element.

Modification Example of First Apparatus

Figure 13:
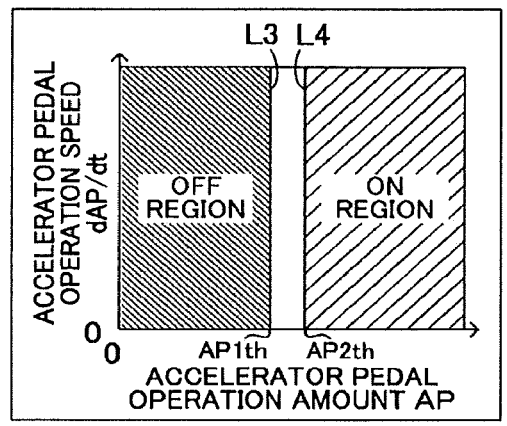
FIG. 13 is a map to which CPU according to a modification example of the first apparatus refers when determining whether or not the specific accelerator pedal operation has occurred.

The modification example of the first apparatus is different from the first apparatus only in a method for determining whether or not the specific accelerator pedal operation has occurred. More specifically, the CPU of the modification example of the first apparatus uses a graph for a determination of the specific driving operation (a map) shown in FIG. 13 in the process of the step 1220 in FIG. 12. A horizontal axis of this graph shows the accelerator pedal operation amount AP, and a vertical axis shows the accelerator pedal operation speed dAP/dt. In this graph, regardless of the accelerator pedal operation speed dAP/dt, a region where the accelerator pedal operation amount AP is less than a line L3 (AP=a first threshold operation amount AP1th) is defined as the "off region", and a region where the accelerator pedal operation amount AP is more than or equal to a line L4 (AP=a second threshold operation amount AP2th) is define as the "on region". It should be noted that the second threshold operation amount AP2th may be more than or equal to the first threshold operation amount AP1th.

That is, the CPU determines that the accelerator pedal 11a is in the accelerator pedal off state when the accelerator pedal operation amount AP is less than the first threshold operation amount AP1th, and determines that the accelerator pedal 11a is in the accelerator pedal on state when the accelerator pedal operation amount AP is more than or equal to the second threshold operation amount AP2th. In addition, the CPU determines that the specific accelerator pedal operation has occurred when it has been detected that the state of the accelerator pedal 11a changes from the accelerator pedal on state to the accelerator pedal off state, and further changes back to the accelerator pedal on state within the threshold time Tath, as is the case with the CPU in the first apparatus.

Second Embodiment

Next, a vehicle control apparatus (hereinafter, may be referred to as a "second apparatus") according to the second embodiment of the present invention will be described. The second apparatus is different from the first apparatus mainly in that the second apparatus performs the abnormality determination of the driver using the confirmation button 80 regardless of whether or not the traffic lane keeping control and the trailing inter-vehicle distance control are being performed, and in that the second apparatus performs the prohibition of the acceleration override and the deceleration control when it is determined that the driver has become the abnormal state (when it is confirmed/finalized that the driver is determined to be in the abnormal state). Hereinafter, a description will be made, focusing on these differences.

Figure 14:
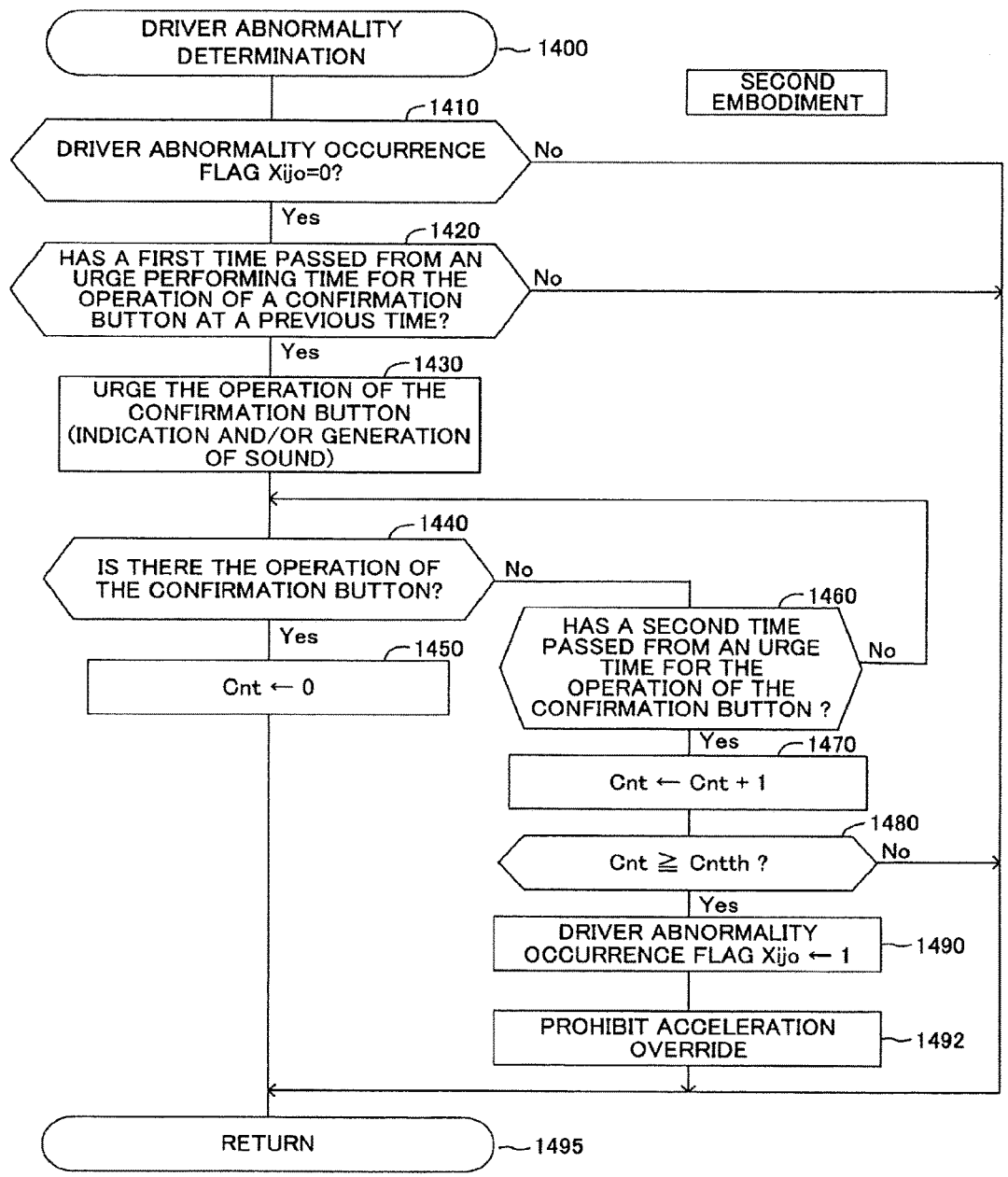
FIG. 14 is a flowchart showing a routine which CPU of a vehicle control apparatus (a second apparatus) according to a second embodiment of the present invention performs in order to determine whether or not a driver is in an abnormal state.
Figure 15:
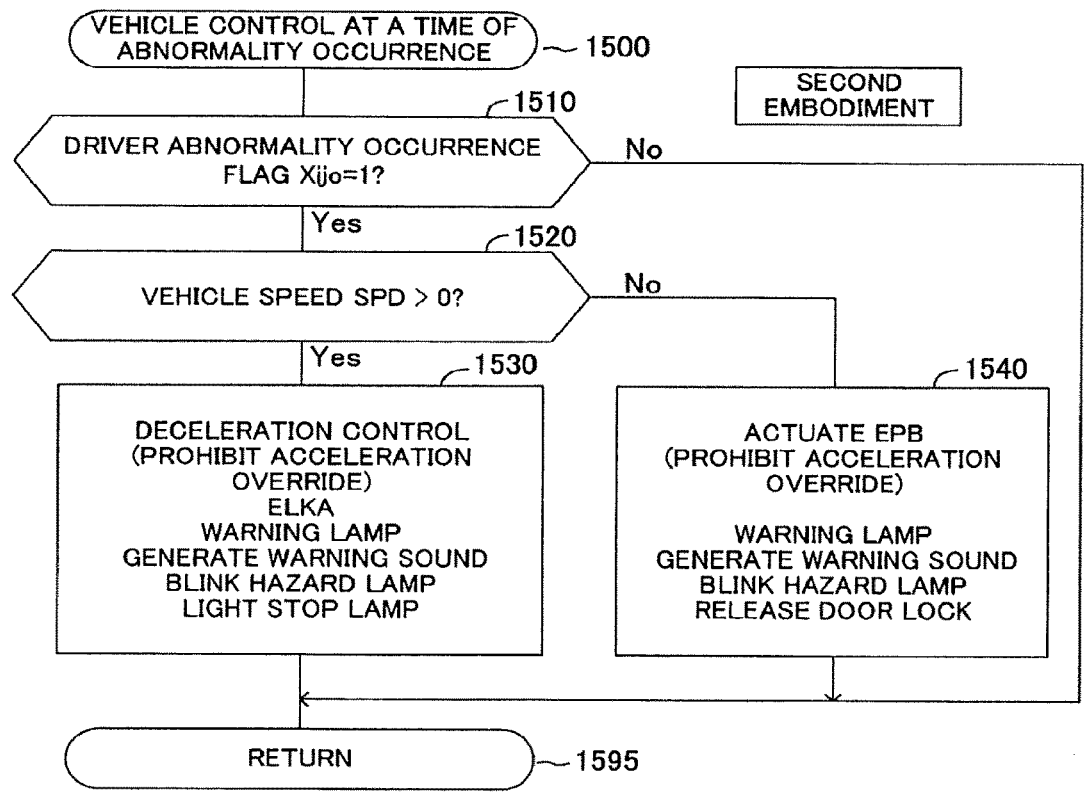
FIG. 15 is a flowchart showing a routine for a driving control which the CPU of the second apparatus performs at a time of an abnormality occurrence.
Figure 16:
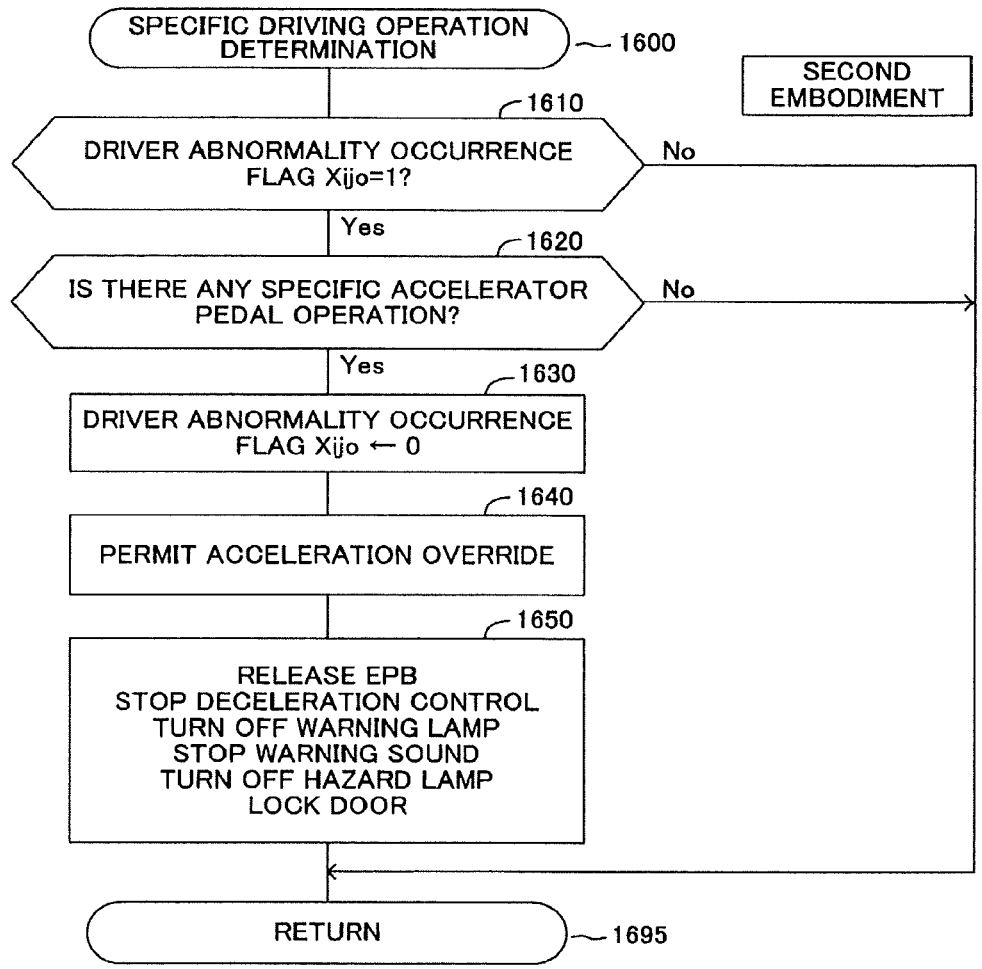
FIG. 16 is a flowchart showing a routine which the CPU of the second apparatus performs in order to determine whether or not the specific driving operation (the specific accelerator pedal operation) has occurred.

CPU of ECU 45 in the second apparatus is configured to perform routines shown by flowcharts in FIG. 14 to FIG. 16 every time a predetermined period of time elapses.

Therefore, when a predetermined point in time arrives, the CPU starts processing with a step 1400 in FIG. 14, and proceeds to a step 1410 to determine whether or not a value of the flag Xijo (the driver abnormality occurrence flag) which shows the determination that the driver is in the abnormal state has been confirmed/finalized is "0". It should be noted that the value of the flag Xijo is configured to be set to "0" in the initialization routine. The value of the driver abnormality occurrence flag Xijo is set to "1" at a step 1490 which will be described later, and is set to "0" at a step 1630 in FIG. 16 which will be described later.

When the value of the driver abnormality occurrence flag Xijo is "1", the CPU makes a "No" determination at the step 1410 to directly proceed to a step 1495, at which the CPU tentatively terminates the present routine.

In contrast, when the value of the driver abnormality occurrence flag Xijo is "0", the CPU makes a "Yes" determination at the step 1410 to proceed to a step 1420, at which the CPU determines whether or not a first time has passed from a point in time (an urge performing time) at which an action to urge the driver to operate the confirmation button 80 is performed. When the first time has not passed from the urge performing time, the CPU makes a "No" determination at the step 1420 to directly proceed to the step 1495, at which the CPU tentatively terminates the present routine.

In contrast, when the first time passes from the urge performing time, the CPU makes a "Yes" determination at the step 1420 to proceed to a step 1430, at which the CPU urges the driver to operate the confirmation button 80. More specifically, the CPU indicates on the indicator 72 a message with a content of "please operate pressing the confirmation button 80", and makes the buzzer 71 sound intermittently using the warning ECU 70. Thereby, in general, the driver operates (operates pressing, that is, performs an on operation) the confirmation button 80 unless the driver has become the abnormal state.

Next the CPU proceeds to a step 1440 to determine whether or not the confirmation button 80 has been operated. When the confirmation button 80 has been operated, the CPU makes a "Yes" determination at the step 1440, to proceed to a step 1450, at which the CPU sets (clears) a value of a counter Cnt to "0", and proceeds to the step 1495 to tentatively terminate the present routine.

In contrast, when the confirmation button 80 has not been operated at a point in time when the CPU performs the process of the step 1440, the CPU makes a "No" determination at the step 1440 to proceed to a step 1460, at which the CPU determines whether or not a second time has passed from a point in time at which the operation of the confirmation button 80 was urged (that is, the point in time at which the process of the step 1430 was performed). The second time is set to be shorter than the first time.

When the second time has not passed from the point in time at which the operation of the confirmation button 80 was urged, the CPU makes a "No" determination at the step 1460 to return to the step 1440. Therefore, the CPU monitors whether or not the operation of the confirmation button 80 has been made during a period from the point in time at which the operation of the confirmation button 80 was urged to the point in time at which the second time has passed.

If the operation of the confirmation button 80 has not been made during the period from the point in time at which the operation of the confirmation button 80 was urged to the point in time at which the second time has passed, the CPU makes a "Yes" determination at the step 1460 to proceed to a step 1470, at which the CPU increases the value of the counter Cnt by "1."

Next, the CPU proceeds to a step 1480 to determine whether or not the value of the counter Cnt is more than or equal to a threshold value Cntth. When the value of the counter Cnt is less than the threshold value Cntth, the CPU makes a "No" determination at the step 1480 to directly proceed to the step 1495, at which the CPU tentatively terminates the present routine. In this case, when the first time passes, the CPU again performs the processes after the step 1430.

Even when the operation of the confirmation button 80 is urged every time the first time passes in the aforementioned manner, the operation of the confirmation button 80 is not made when the driver is in the abnormal state. As a result, the value of the counter Cnt is increased at the step 1470 to become a value larger than or equal to the threshold value Cntth. In this case, the CPU makes a "Yes" determination at the step 1480 to proceed to the step 1490, at which the CPU sets the value of the driver abnormality occurrence flag Xijo to "1." In other words, the CPU confirms/finalizes the determination that the driver is in the abnormal state.

Next, the CPU proceeds to a step 1492 to prohibit the acceleration override. That is, after this point in time (i.e., an abnormality determination point in time, an abnormality determination confirmation/finalized time), the CPU prohibits the vehicle from accelerating (including decelerating.) based on the change in the accelerator pedal operation amount AP (that is, the CPU invalidates/ignores the acceleration request based on the accelerator pedal operation.). Thereafter, the CPU proceeds to the step 1495 to tentatively terminate the present routine.

In the meantime, when a predetermined point in time arrives, the CPU starts processing with a step 1500 in FIG. 15, and proceeds to a step 1510 to determine whether or not the value of the driver abnormality occurrence flag Xijo is "1." When the value of the driver abnormality occurrence flag Xijo is not "1", the CPU makes a "No" determination at the step 1510 to directly proceed to the step 1595, at which the CPU tentatively terminates the present routine.

In contrast, when the value of the driver abnormality occurrence flag Xijo is "1", the CPU makes a "Yes" determination at the step 1510, and proceeds to a step 1520 to determine whether or not the vehicle speed SPD is more/higher than "0" (whether or not the vehicle is traveling).

When the vehicle speed SPD is more/higher than "0", the CPU makes a "Yes" determination at the step 1520 to proceed to the step 1530, at which the CPU performs a deceleration control. This deceleration control is the same control as the aforementioned second deceleration control which the first apparatus performs. At this time, the acceleration override is prohibited. Further, the CPU performs the aforementioned traffic lane keeping control after confirmation of abnormality (ELKA), lights the warning lamp on the indicator 21, and generates a warning sound. This warning sound is the same warning sound as the aforementioned fourth warning sound. In addition, the CPU makes the hazard lamp 61 blink, and makes the stop lamp 62 light. Thereafter, the CPU proceeds to the step 1595 to tentatively terminate the present routine.

In contrast, when the vehicle speed SPD is "0" (that is, when the vehicle stops) at a point in time when the CPU performs the process of the step 1520, the CPU makes a "No" determination at the step 1520, and proceeds to a step 1540 to add the parking brake force to each of the wheels using the EPB ECU 40. At this time, the acceleration override is prohibited. Further, the CPU lights the warning lamp on the indicator 21, generates the same warning sound as the aforementioned fifth warning sound, makes the hazard lamp 61 blink, and releases the door lock. Thereafter, the CPU proceeds to the step 1595 to tentatively terminate the present routine.

In addition, when a predetermined point in time arrives, the CPU starts processing with a step 1600 in FIG. 16, and proceeds to a step 1610 to determine whether or not the value of the driver abnormality occurrence flag Xijo is "1". When the value of the driver abnormality occurrence flag Xijo is not "1", the CPU makes a "No" determination at the step 1610 to directly proceed to the step 1695, at which the CPU tentatively terminates the present routine.

In contrast, when the value of the driver abnormality occurrence flag Xijo is "1", the CPU makes a "Yes" determination at the step 1610, and proceeds to a step 1620 to determine whether or not the specific accelerator pedal operation serving as the specific driving operation has occurred. The process in this step 1620 is the same as the process in the step 1220 in FIG. 12 at which the first apparatus or the modification example of the first apparatus described above performs. When the specific accelerator pedal operation has not occurred, the CPU makes a "No" determination at the step 1620 to directly proceed to the step 1695, at which the CPU tentatively terminates the present routine.

In contrast, when the specific accelerator pedal operation has occurred, the CPU makes a "Yes" determination at the step 1620, performs processes of steps from a step 1630 to a step 1650 in sequence which will be described below, and proceeds to the step 1695 to tentatively terminate the present routine.

Step 1630: the CPU sets (clears) the value of the driver abnormality occurrence flag Xijo to "0."

Step 1640: the CPU permits the acceleration override. That is, the CPU permits the vehicle to accelerate (including decelerate) based on the change in the accelerator pedal operation amount AP. In other words, the driving support ECU 10 permits the normal driving control of the vehicle based on the operation of the driving operation elements (the accelerator pedal) by the driver.

Step 1650: when the parking brake force is being added to each of the wheels by the EPB ECU 40, the CPU vanishes the parking brake force (releases the EPB), and when the deceleration control is being performed, the CPU stops the deceleration control, turns off the hazard lamp 61 and the stop lamp 62, turns off the warning lamp, stops the warning sound, and locks the door.

As is described above, the second apparatus can make the determination as to whether or not the driver has become the abnormal state using a simple configuration (that is, using the confirmation button 80).

Third Embodiment

Next, a vehicle control apparatus (hereinafter, may be referred to as a "third apparatus") according to the third embodiment of the present invention will be described. The third apparatus is different from the first apparatus in that the third apparatus adopts so-called a "steer-by-wire system", it invalidates the operation of the steering wheel as well as the operation of the accelerator pedal when the determination that the driver is in the abnormal state has been confirmed/finalized, and it determines whether or not the specific driving operation has occurred based on the operation of the steering wheel after the point in time (the abnormality determination point in time, the abnormality determination confirmation/finalized time) at which the determination that the driver abnormality occurred has been confirmed/finalized. Hereinafter, a description will be made, focusing on these differences.

Figure 17:
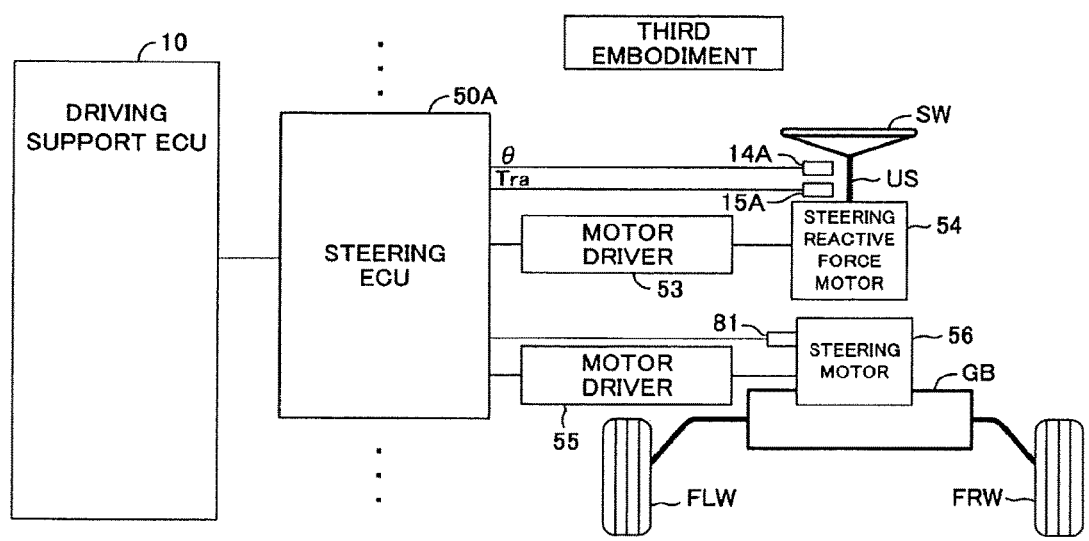
FIG. 17 is a schematic configuration diagram showing a steer-by-wire system which a vehicle control apparatus according to a third embodiment of the present invention (a third apparatus) adopts.

The steer-by-wire system which the third apparatus adopts is a steering wheel system where the steering wheel SW and a turning mechanism GB are not mechanically coupled to each other as shown in FIG. 17, and is well known (for example, refer to Japanese Patent Applications Laid-Open (kokai) No. 2001-301639, No. 2004-182061, No. 2008-126685, and International Publication No. 2012/086502).

A simple description will be made below. The third apparatus is different from the first apparatus in terms of a configuration in that the third apparatus comprises, as shown in FIG. 17, "a steering ECU 50A, a motor driver 53, a steering reactive force motor 54, a motor driver 55, and a steering motor 56" instead of "the steering ECU 50, the motor driver 51, and the steering motor 52" which the first apparatus comprises. Therefore, a driving support ECU 10 in the third apparatus is connected to other ECUs, sensors and switches shown in FIG. 1. The steering ECU 50A is connected to the driving support ECU 10 via CAN so that they are capable of mutually transmitting and receiving information.

The steering ECU 50A is connected to the motor driver 53 and is configured to control the motor driver 53. The motor driver 53 is connected to the steering reactive force motor 54. The steering reactive force motor 54 is arranged in such a manner that the steering reactive force motor 54 is capable of transmitting torque to an upper shaft US coupled to the steering wheel SW. The steering reactive force motor 54 is configured to be capable of generating torque by electric power supplied from the motor driver 53, and of adding a steering reactive force to the steering wheel SW with this generated torque via the upper shaft US.

The steering ECU 50A is connected to the motor driver 55 and is configured to control the motor driver 55. The motor driver 55 is connected to the steering motor 56. The steering motor 56 is configured to rotate a pinion having a pinion gear which is engaged with a rack gear formed in a rack of the turning mechanism GB. Therefore, the steering motor 56 is configured to be capable of generating torque with electric power supplied from the motor driver 55, rotating the pinion by this generated torque, thereby turning left and right steered wheels FLW, FRW by moving a rack shaft and a tie rod.

Further, the steering ECU 50A is connected to a steering angle sensor 14A, a steering torque sensor 15A, and a steering motor rotating angle sensor 81, and is configured to receive signals from these sensors (a steering angle θ, a steering torque Tra, and a steering motor rotating angle Ma). In addition, when the traffic lane keeping control is not being performed, the steering ECU 50A receives the vehicle speed SPD from the driving support ECU 10, determines a target value of the steering motor rotating angle based on the vehicle speed SPD, the steering angle θ, and the steering torque Tra, controls the motor driver 55 in such a manner that the steering motor rotating angle Ma matches with (becomes equal to) the target value of the steering motor rotating angle to changes a steering/turning angle. Furthermore, when the traffic lane keeping control is not being performed, the steering ECU 50A determines a target value of torque which the steering reactive force motor 54 should generate based on the vehicle speed SPD, the steering angle θ, and the steering torque Tra, and controls the motor driver 53 in such a manner that the steering reactive force motor 54 generates torque equal to the target value of the torque.

On the other hand, when the traffic lane keeping control is being performed, the steering ECU 50A receives the target value of the steering motor rotating angle from the driving support ECU 10, controls the motor driver 55 in such a manner that the steering motor rotating angle Ma matches with (becomes equal to) the target value of the steering motor rotating angle to change the steering (turning) angle. Further, when the traffic lane keeping control is being performed, the steering ECU 50A receives the target value of torque which the steering reactive force motor 54 should generate from the driving support ECU 10, and controls the motor driver 53 in such a manner that the steering reactive force motor 54 generates torque equal to the target value of the torque.

Figure 18:
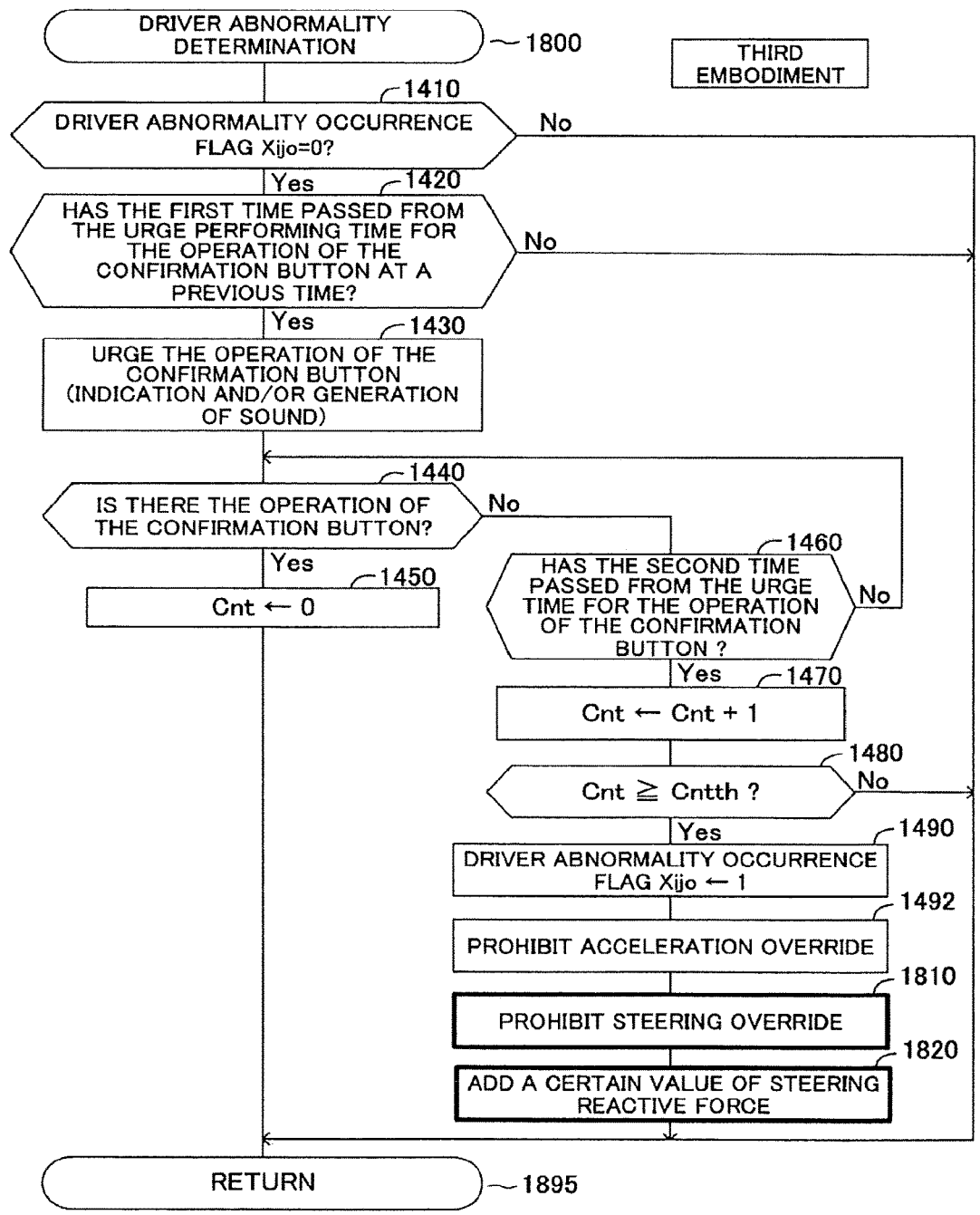
FIG. 18 is a flowchart showing a routine which CPU of the third apparatus performs in order to determine whether or not the driver is in the abnormal state.
Figure 19:
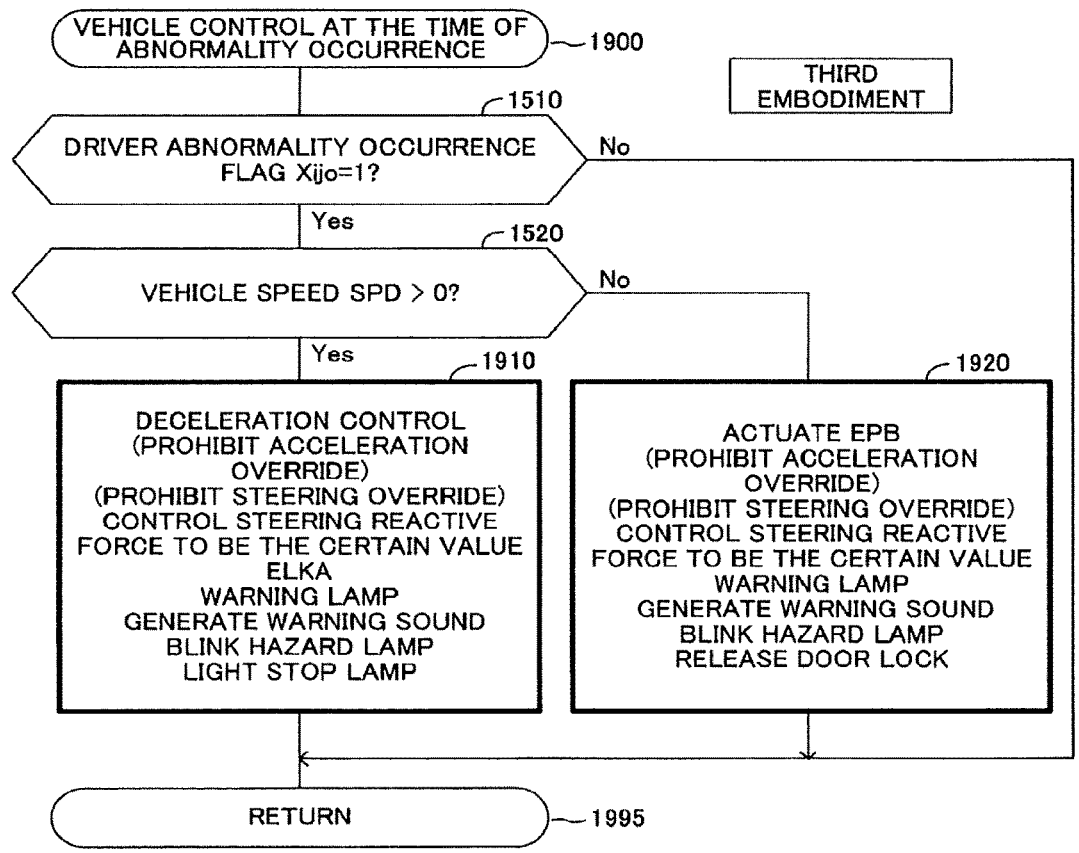
FIG. 19 is a flowchart showing a routine for a driving control which the CPU of the third apparatus performs at the time of abnormality occurrence.
Figure 20:
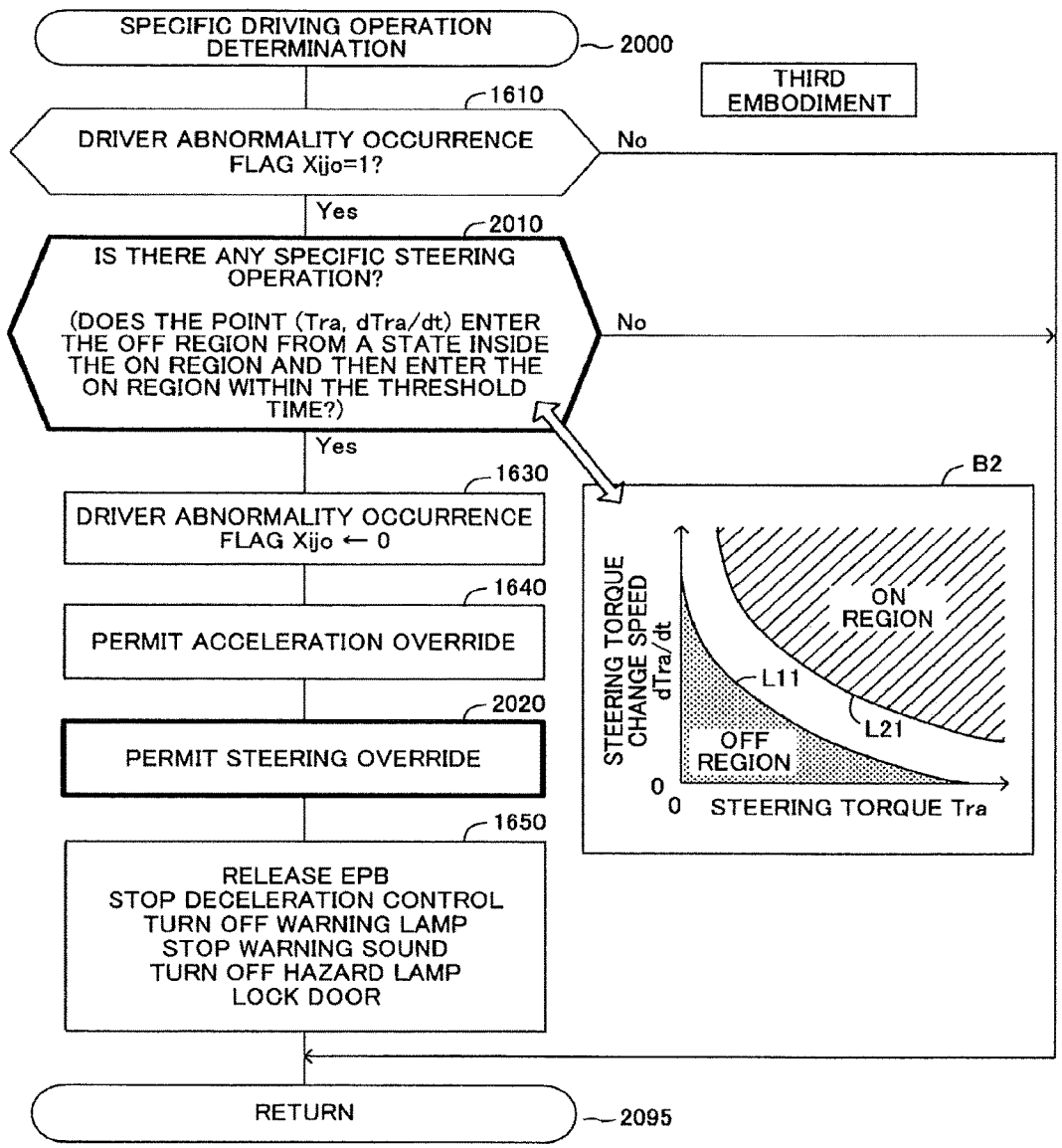
FIG. 20 is a flowchart showing a routine which the CPU of the third apparatus performs in order to determine whether or not a specific driving operation (a specific steering operation) has occurred.

The CPU of the driving support ECU 10 in the third apparatus is configured to perform routines shown by flowcharts in FIG. 18 to FIG. 20.

A routine shown in FIG. 18 is different from the routine shown in FIG. 14 only in that a step 1810 and a step 1820 are added to the routine shown in FIG. 14. Therefore, only this difference will be described. The CPU of the third apparatus confirms/finalizes the determination that "the driver is in the abnormal state", when the condition in the step 1480 is satisfied, as is the case with the CPU of the second apparatus. In addition, the CPU of the third apparatus sets the value of the driver abnormality occurrence flag Xijo to "1" at the step 1490, and prohibits the acceleration override at the step 1492.

Thereafter, the CPU of the third apparatus proceeds to the step 1810 to prohibit the steering override. That is, the CPU prohibits the steered wheel from turning based on a change in an operation amount of the steering wheel SW as long as "a specific steering operation" serving as the specific driving operation" which will be described later is not detected, even when the operation amount of the steering wheel SW (at least one of the steering angle θ and the steering torque Tra) changes. In other words, the driving support ECU 10 invalidates (ignores) a driving request based on the operation of the steering wheel SW (a turning request) as long as the "specific steering operation" is not detected after the point in time (the abnormality determination point in time, the abnormality determination confirmation/finalized time) at which the determination that the driver is in the abnormal state has been confirmed/finalized.

In addition, the CPU of the third apparatus proceeds to the step 1820 to control the torque which the steering motor 56 generates via the motor driver 53 in such a manner that the steering reactive force becomes a certain value when the steering wheel SW is operated.

On the other hand, when a predetermined point in time arrives, the CPU of the third apparatus starts processing with a step 1900 in FIG. 19. A routine shown in FIG. 19 is different from the routine shown in FIG. 15 only in that the step 1530 and the step 1540 in the routine shown in FIG. 15 are replaced with a step 1910 and a step 1920, respectively. Therefore, only this difference will be described.

The CPU of the third apparatus performs a process of the step 1910 when the value of the driver abnormality occurrence flag Xijo is "1" and the vehicle speed SPD is more/higher than "0." The process in this step 1910 is different from the process in the step 1530 only in that a process of prohibiting the steering override and a process of maintaining the steering reactive force to be the certain value have been added.

Besides, the CPU of the third apparatus performs a process of the step 1920 when the value of the driver abnormality occurrence flag Xijo is "1" and the vehicle speed SPD is "0." The process in this step 1920 is different from the process in the step 1540 only in that the process of prohibiting the steering override and the process of maintaining the steering reactive force at the certain constant value are added to the process in the step 1540.

In addition, when a predetermined point in time arrives, the CPU of the third apparatus starts processing with a step 2000 in FIG. 20. A routine shown in FIG. 20 is different from the routine shown in FIG. 16 only in that the step 1620 in FIG. 16 is replaced with a step 2010, and a step 2020 is added between the step 1640 and the step 1650 in FIG. 16. Therefore, only those differences will be described.

When the value of the driver abnormality occurrence flag Xijo is "1", the CPU of the third apparatus makes a "Yes" determination in the step 1610, and proceeds to the step 2010 to determine whether or not the specific steering operation serving as the specific driving operation has occurred.

More specifically, in ROM of the driving support ECU 10 in the third apparatus, a graph for a determination of the specific driving operation (a graph for a determination of the specific steering operation) shown in a block B2 in FIG. 20 is stored in a form of a map. A horizontal axis of this graph shows the steering torque Tra and a vertical axis shows a time differential value dTra/dt of the steering torque Tra (a change amount per unit time of the steering torque Tra, and hereinafter will be also referred to as a "steering torque change speed".).

In this graph, a region located on/in an origin (Tra=0, dTra/dt=0) side with respect to a curved line L11 on which the steering torque change speed dTra/dt becomes smaller as the steering torque Tra becomes larger is defined as an "off region". When a point (Tra, dTra/dt) which represents an operational state of the steering wheel serving as one of the driving operation elements is inside the off region, the steering wheel can be regarded as not being operated. In addition, a region located on/in an opposite side to the origin with respect to a curved line L21 is defined as an "on region". The line L21 is approximately parallel to the curved line L11, and is obtained by translating the curved line L11 in a direction where each of the steering torque Tra and the steering torque change speed dTra/dt becomes larger. When the point (Tra, dTra/dt) is inside the on region, the steering wheel can be regarded as being operated. That is, in this case, it can be regarded that the accelerator pedal is in an operating state. It should be noted that the curved line L11 and the curved line L21 may be the same line.

The CPU of the third apparatus determines that the specific steering operation has occurred in the step 2010, when "the point (Tra, dTra/dt) which represents the operational state of the steering wheel serving as the driving operation element" defined by the steering torque Tra and the steering torque change speed enters the off region from the on region and then enters the on region within a predetermined time (a certain threshold time Tbth). It should be noted that the state where the point (Tra, dTra/dt) is inside the on region may be referred to as "a steering operation on state or a steering wheel operating state", and the state where the point (Tra, dTra/dt) is inside the off region may be referred to as "a steering operation off state or a steering wheel non-operating state".

When the specific steering operation has not occurred, the CPU of the third apparatus makes a "No" determination at the step 2010 to directly proceed to a step 2095, at which the CPU tentatively terminates the present routine. In contrast, when the specific steering operation has occurred, the CPU makes a "Yes" determination at the step 2010 to perform the processes of the step 1630 and the step 1640 described above.

Next, the CPU proceeds to the step 2020 to permit the steering override. That is, the CPU controls the steering motor 56 in such a manner that steering of the steered wheels FLW and FRW based on the operation of the steering wheel is permitted. Thereafter, the CPU performs the process of the step 1650 described above, and proceeds to the step 2095 to tentatively terminate the present routine. It should be noted that, if the stop lamp 62 is lighting at a point in time when the process of this step 1650 is performed, the CPU turns off the stop lamp 62.

As is described above, the third apparatus can make the determination as to whether or not the driver has become the abnormal state, and stop the vehicle safely, while invalidating/ignoring the driving state change request based on the operation of the steering wheel from the point in time at which the determination that the driver is in the abnormal state has been confirmed/finalized. Further, when it has been ensured that the driver is not in the abnormal state (that is, when the specific steering operation using the steering wheel serving as the driving operation element has been detected in a situation where the steering override is being prohibited), the third apparatus can make the vehicle drive in response to the driving state change request based on the steering wheel.

First Modification Example of Third Apparatus

Figure 21:
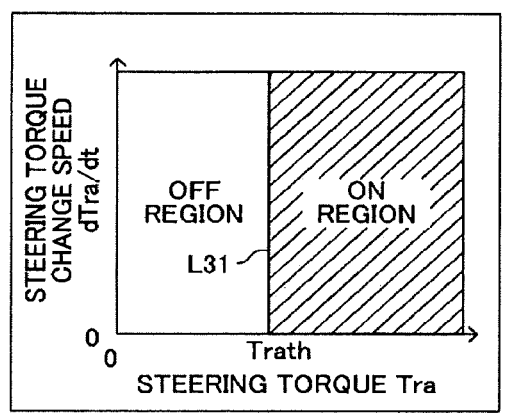
FIG. 21 is a map to which CPU according to a first modification example of the third apparatus refers when determining whether or not the specific steering operation has occurred.

The first modification example of the third apparatus is different from the third apparatus only in a method for determining whether or not the specific steering operation has occurred. More specifically, the CPU in the first modification example of the third apparatus uses a graph for a determination of the specific driving operation shown in FIG. 21 in the process of the step 2010 in FIG. 20. A horizontal axis of this graph shows the steering torque Tra and a vertical axis shows the steering torque change speed dTra/dt. In this graph, regardless of the steering torque change speed dTra/dt, a region where the steering torque Tra is less than a line L31 (Tra=Trath) is defined as an "off region", and a region where the steering torque Tra is more than or equal to the line L31 is define as an "on region". That is, in this first modification example, the steering wheel is determined to be in the non-operating state (the steering operation off state), when the steering torque Tra is less than the threshold Trath, and the steering wheel is determined to be in the operating state (the steering operation on state), when the steering torque Tra is more than or equal to the threshold Trath. Further, the CPU determines that the specific steering operation has occurred when the steering wheel becomes from the operating state to the non-operating state and then becomes the operating state within the predetermined time (the certain threshold time Tbth).

Second Modification Example of Third Apparatus

The second modification example of the third apparatus is different from the third apparatus only in a method for determining whether or not the specific steering operation has occurred. More specifically, in the process of the step 2010 in FIG. 20, the CPU of the second modification example of the third apparatus determines that the steering wheel is in the non-operating state (the steering operation off state) when the steering angle $\theta$ is less than a threshold $\theta$th, determines that the steering wheel is in the operating state (the steering operation on state) when the steering angle $\theta$ is more than or equal to the threshold $\theta$th, and determines that the specific steering operation has occurred when the steering wheel changes from the operating state to the non-operating state and further changes to the operating state within the predetermined time (the certain threshold time Tbth).

Third Modification Example of Third Apparatus

A driving support ECU 10 as the third modification example of the third apparatus continues prohibition of the acceleration override and prohibition of the steering override, as long as it is not determined that at least one of "the specific steering operation and the specific accelerator pedal operation" has occurred after the point in time at which the determination that "the driver is in the abnormal state" has been confirmed/finalized (the abnormality determination point in time, the abnormality determination confirmation/finalized time). In other words, the driving support ECU 10 as the third modification example of the third apparatus permits both of the acceleration override and the steering override when at least one of "the specific steering operation and the specific accelerator pedal operation" has been detected (i.e., when it is determined that at least one of them has occurred) after the abnormality determination point in time. It should be noted that in this case, a method for determining whether or not the specific steering operation has occurred may be any method among the aforementioned methods, and a method for determining whether or not the specific accelerator pedal operation has occurred may be any method among the aforementioned methods.

The present invention is not limited to the aforementioned embodiments and may adopt various modification examples within a scope of the present invention as described below. For example, the first apparatus may proceed to the mode in which it is confirmed whether or not the driver is in the abnormal state where the driver loses the ability to drive the vehicle (the third mode) when driving without holding the steering wheel continues for a predetermined time (T1th+T2th) while at least the traffic lane keeping control (LKA) is being performed regardless of whether or not the trailing inter-vehicle distance control is being performed. Further, the first apparatus may confirm/finalize the determination that the driver is in the abnormal state at the point in time at which the mode moves from the second mode to the third mode.

Further, in the above embodiments, the acceleration override is permitted after it is determined that the specific driving operation has occurred and the value of the driver abnormality occurrence flag Xijo is returned from "1" to "0" (the acceleration override is permitted after the determination that the driver is in the abnormal state is cancelled). In this case, it may be configured that an acceleration request is generated, wherein a degree of the generated acceleration request is smaller than a degree of the acceleration request corresponding to the accelerator pedal operation amount AP in a period when the acceleration override had been permitted before the driver abnormal occurrence flag Xijo was set to "1".

Furthermore, for example, a so-called "driver monitor technique" which is disclosed in a Japanese Patent Application Laid-Open (kokai) No. 2013-152700 and the like may be adopted as the abnormality determination means by which the abnormality determination of the driver is performed. More specifically, the following technique may be adopted as the abnormality determination means.

The driver is photographed by a camera provided on an interior member of a vehicle (for example, a steering wheel, a pillar, and the like), and a direction of a driver's line of sight or a driver's face direction is monitored using this photographed image. Thereafter, the driver may be determined to be in the abnormal state, when the driver's line of sight or the driver's face direction has been in a certain direction for more than or equal to a predetermined time, wherein the certain direction is a direction to which the driver's line of sight or the driver's face direction does not normally face while driving normally.

The invention claimed is:

1. A vehicle control apparatus applied to a vehicle comprising;
abnormality determination means for determining whether or not a driver of said vehicle is in an abnormal state where said driver loses an ability to drive said vehicle;
driving operation invalidation means for invalidating a driving state change request which is based on an operation of a driving operation element operated by said driver for a purpose of changing a driving state of said vehicle after an abnormality determination point in time at which said driver has been determined to be in said abnormal state; and
specific operation determination means for determining whether or not a specific driving operation has occurred after said abnormality determination point in time, said specific driving operation being an operation that a state of said driving operation element changes, within a predetermined threshold time, from an operating state in which said driving operation element is regarded as being operated to a non-operating state in which said driving operation element is regarded as not being operated and thereafter again changes to said operating state,
wherein said driving operation invalidation means is configured to cancel invalidating said driving state change request and thereby to allow said driver to change said driving state of said vehicle when said specific driving operation is determined to have occurred.

2. The vehicle control apparatus according to claim 1, further comprising warning means for generating a warning to said driver at latest from said abnormality determination point in time,
wherein said warning means is configured to stop said warning when said specific driving operation is determined to have occurred.

3. The vehicle control apparatus according to claim 2, wherein said driving operation invalidation means and said specific operation determination means adopt, as said driving operation element, an accelerator pedal used for changing an acceleration state as a driving state of said vehicle,
wherein said vehicle control apparatus further comprises deceleration means for forcibly decelerating, at latest from said abnormality determination point in time, said vehicle so that said vehicle stops driving, and
wherein said deceleration means is configured to stop said forcible deceleration when said specific driving operation is determined to have occurred.

4. The vehicle control apparatus according to claim 3, wherein said specific operation determination means is configured to:
determine that said accelerator pedal is in said non-operating state when an accelerator pedal operational state, defined by an operation amount of said accelerator pedal and a change amount per unit time of said operation amount of said accelerator pedal, is inside an off region located on a side of an origin with respect to a first boundary line, wherein said origin is a point at which both said operation amount and said change amount are zero, and said first boundary line is a line which defines a relationship between said change amount and said operation amount in such a manner that said change amount becomes smaller as said operation amount becomes larger; and
determine that said accelerator pedal is in said operating state when said accelerator pedal operational state is inside an on region located on a side opposite to said origin with respect to a second boundary line which defines a relationship between said change amount and said operation amount in such a manner that said change amount becomes smaller as said operation amount becomes larger, and
wherein said first boundary line and said second boundary line are set in such a manner that a change amount of said accelerator pedal on said second boundary line of when said operation amount of said accelerator pedal has an arbitrary value is more than or equal to a change amount of said accelerator pedal on said first boundary line of when said operation amount of said accelerator pedal has said arbitrary value.

5. The vehicle control apparatus according to claim 3, wherein said specific operation determination means is configured to:
determine that said accelerator pedal is in said non-operating state when an operation amount of said accelerator pedal is less than a first threshold operation amount; and
determine that said accelerator pedal is in said operating state when said operation amount of said accelerator pedal is more than or equal to a second operation amount which is more than or equal to said first threshold operation amount.

6. The vehicle control apparatus according to claim 1, wherein said abnormality determination means is configured to determine that said driver is in said abnormal state when a state where a steering amount correlation value which changes when a steering wheel of said vehicle is operated does not change continues over more than or equal to an abnormality determination threshold time.

7. The vehicle control apparatus according to claim 6, further comprising:
trailing inter-vehicle distance control means for performing a trailing inter-vehicle distance control for a purpose of making said vehicle trail travel, keeping a predetermined inter-vehicle distance from an other vehicle traveling immediately ahead said vehicle; and
traffic lane keeping control means for performing a traffic lane keeping control to recognize a traveling lane where said vehicle is traveling and to control a steering angle of each of steered wheels of said vehicle in such a manner that said vehicle does not deviate from said traveling lane, wherein said abnormality determination means is configured to start a determination of whether or not said driver is in said abnormal state in a case when both said trailing inter-vehicle distance control and said traffic lane keeping control are being performed.

8. The vehicle control apparatus according to claim 1, wherein said driving operation invalidation means and said specific operation determination means adopt, as said driving operation element, a steering wheel used for changing a steering state as said driving state of said vehicle.

9. A vehicle control apparatus applied to a vehicle comprising:
an electric control unit configured to:
determine whether or not a driver of said vehicle is in an abnormal state where said driver loses an ability to drive said vehicle;
invalidate a driving state change request which is based on an operation of a driving operation element operated by said driver for a purpose of changing a driving state of said vehicle after an abnormality determination point in time at which said driver has been determined to be in said abnormal state; and
determine whether or not a specific driving operation has occurred after said abnormality determination point in time, said specific driving operation being an operation that a state of said driving operation element changes, within a predetermined threshold time, from an operating state in which said driving operation element is regarded as being operated to a non-operating state in which said driving operation element is regarded as not being operated and thereafter again changes to said operating state,
wherein said electric control unit is configured to cancel invalidating said driving state change request and thereby to allow said driver to change said driving state of said vehicle when said specific driving operation is determined to have occurred.

10. The vehicle control apparatus according to claim 9, wherein said electric control unit is further configured to:
generate a warning to said driver at latest from said abnormality determination point in time; and
stop said warning when said specific driving operation is determined to have occurred.

11. The vehicle control apparatus according to claim 10, wherein said electric control unit is further configured to:
adopt, as said driving operation element, an accelerator pedal used for changing an acceleration state as a driving state of said vehicle;
forcibly decelerate, at latest from said abnormality determination point in time, said vehicle so that said vehicle stops driving; and
stop said forcible deceleration when said specific driving operation is determined to have occurred.

12. The vehicle control apparatus according to claim 11, wherein said electric control unit is further configured to:
determine that said accelerator pedal is in said non-operating state when an accelerator pedal operational state, defined by an operation amount of said accelerator pedal and a change amount per unit time of said operation amount of said accelerator pedal, is inside an off region located on a side of an origin with respect to a first boundary line, wherein said origin is a point at which both said operation amount and said change amount are zero, and said first boundary line is a line which defines a relationship between said change amount and said operation amount in such a manner that said change amount becomes smaller as said operation amount becomes larger; and
determine that said accelerator pedal is in said operating state when said accelerator pedal operational state is inside an on region located on a side opposite to said origin with respect to a second boundary line which defines a relationship between said change amount and said operation amount in such a manner that said change amount becomes smaller as said operation amount becomes larger, and
wherein said first boundary line and said second boundary line are set in such a manner that a change amount of said accelerator pedal on said second boundary line of when said operation amount of said accelerator pedal has an arbitrary value is more than or equal to a change amount of said accelerator pedal on said first boundary line of when said operation amount of said accelerator pedal has said arbitrary value.

13. The vehicle control apparatus according to claim 11, wherein said electric control unit is further configured to:
determine that said accelerator pedal is in said non-operating state when an operation amount of said accelerator pedal is less than a first threshold operation amount; and
determine that said accelerator pedal is in said operating state when said operation amount of said accelerator pedal is more than or equal to a second operation amount which is more than or equal to said first threshold operation amount.

14. The vehicle control apparatus according to claim 9, wherein said electric control unit is further configured to determine that said driver is in said abnormal state when a state where a steering amount correlation value which changes when a steering wheel of said vehicle is operated does not change continues over more than or equal to an abnormality determination threshold time.

15. The vehicle control apparatus according to claim 14, wherein said electric control unit is further configured to:
perform a trailing inter-vehicle distance control for a purpose of making said vehicle trail travel, keeping a predetermined inter-vehicle distance from an other vehicle traveling immediately ahead said vehicle;
perform a traffic lane keeping control to recognize a traveling lane where said vehicle is traveling and to control a steering angle of each of steered wheels of said vehicle in such a manner that said vehicle does not deviate from said traveling lane; and
start a determination of whether or not said driver is in said abnormal state in a case when both said trailing inter-vehicle distance control and said traffic lane keeping control are being performed.

16. The vehicle control apparatus according to claim 9, wherein said electric control unit is further configured to adopt, as said driving operation element, a steering wheel used for changing a steering state as said driving state of said vehicle.

* * * * *